(12) United States Patent
Mosch

(10) Patent No.: US 12,312,013 B2
(45) Date of Patent: May 27, 2025

(54) DEVICE FOR COMPENSATING FOR TOLERANCES

(71) Applicant: WITTE AUTOMOTIVE GMBH, Velbert (DE)

(72) Inventor: Gerhard Mosch, Duisburg (DE)

(73) Assignee: WITTE AUTOMOTIVE GMBH, Velbert (DE)

( * ) Notice: Subject to any disclaimer, the term of this patent is extended or adjusted under 35 U.S.C. 154(b) by 1031 days.

(21) Appl. No.: 16/966,842

(22) PCT Filed: Jan. 10, 2019

(86) PCT No.: PCT/EP2019/050595
§ 371 (c)(1),
(2) Date: Jul. 31, 2020

(87) PCT Pub. No.: WO2019/149500
PCT Pub. Date: Aug. 8, 2019

(65) Prior Publication Data
US 2021/0039720 A1     Feb. 11, 2021

(30) Foreign Application Priority Data

Feb. 1, 2018  (DE) .......................... 102018102291.3
Jul. 26, 2018  (DE) .......................... 202018104330.7

(51) Int. Cl.
*F16B 5/02*     (2006.01)
*B62D 27/06*    (2006.01)
*B62D 65/02*    (2006.01)

(52) U.S. Cl.
CPC ......... *B62D 27/065* (2013.01); *B62D 65/024* (2013.01); *F16B 5/0225* (2013.01); *F16B 5/0233* (2013.01); *F16B 5/025* (2013.01)

(58) Field of Classification Search
CPC .. B62D 27/065; B62D 65/025; B62D 27/023; B62D 65/024; F16B 5/0225; F16B 5/0233; F16B 5/025; F16B 5/0216; F16B 5/023; F16B 5/0275; F16B 5/0283; Y10T 403/33
USPC .......... 296/203.01, 29; 403/167, 168, 408.1; 411/546
See application file for complete search history.

(56) References Cited

U.S. PATENT DOCUMENTS 6,053,680 A     4/2000  Menke
6,357,953 B1 *  3/2002  Ballantyne ............ F16B 5/0233
                                        403/372

(Continued)

FOREIGN PATENT DOCUMENTS

DE          3620005 C1    9/1987
DE          3932193 C2    7/1992

(Continued)

*Primary Examiner* — Amy R Weisberg
*Assistant Examiner* — Wenwei Zhuo
(74) *Attorney, Agent, or Firm* — Wiggin and Dana LLP

(57) ABSTRACT

A device for compensating for tolerances between two parts, in particular vehicle parts, that are to be connected by means of a connecting screw, with a holding device for arranging on a first part, and a compensation device that may be brought into contact with a second part and is situated so as to be movable relative to the holding device, wherein the compensation device has an inner engagement structure for form-fit engagement with threads of the connecting screw.

19 Claims, 38 Drawing Sheets

(56) References Cited

U.S. PATENT DOCUMENTS

| | | | |
|---|---|---|---|
| 6,789,993 B2 * | 9/2004 | Ozawa | F16B 5/0233 411/432 |
| 7,488,135 B2 * | 2/2009 | Hasegawa | F16B 5/0233 403/22 |
| 7,857,567 B2 | 12/2010 | Iwata | |
| 2002/0076269 A1 | 6/2002 | Schwarzbich | |
| 2002/0176739 A1 | 11/2002 | Kogyo | |
| 2003/0077142 A1 | 4/2003 | Stone | |
| 2005/0025566 A1 | 2/2005 | Hasegawa | |
| 2007/0009342 A1 | 1/2007 | Figge et al. | |
| 2007/0207012 A1 * | 9/2007 | Lorenzo | F16B 5/0233 411/546 |
| 2008/0038090 A1 | 2/2008 | Figge | |
| 2010/0303582 A1 | 12/2010 | Choi et al. | |
| 2012/0074273 A1 | 3/2012 | Liu | |
| 2012/0128446 A1 | 5/2012 | Baumbach | |
| 2016/0369827 A1 * | 12/2016 | Schmidt | F16B 5/0233 |
| 2017/0016464 A1 * | 1/2017 | Haselberger | B64D 11/02 |

FOREIGN PATENT DOCUMENTS

| | | | | |
|---|---|---|---|---|
| DE | 19626613 A1 | 1/1998 | | |
| DE | 4224575 A1 | 3/1999 | | |
| DE | 19906480 A1 | 11/1999 | | |
| DE | 20021194 U1 | 4/2002 | | |
| DE | 10115247 A1 | 10/2002 | | |
| DE | 10300991 A1 | 7/2004 | | |
| DE | 202006012493 U1 | 12/2006 | | |
| DE | 102005044064 A1 | 3/2007 | | |
| DE | 102007037242 A1 | 2/2008 | | |
| DE | 102008037071 A1 | 2/2010 | | |
| DE | 102010051923 A1 | 5/2012 | | |
| DE | 102011056465 A1 | 6/2013 | | |
| DE | 10315690 B4 | 7/2013 | | |
| DE | 202014100259 U1 | 3/2014 | | |
| DE | 102016106006 A1 | 10/2017 | | |
| DE | 102009044635 B9 | 7/2018 | | |
| EP | 0533513 A1 | 3/1993 | | |
| EP | 0632205 A1 | 1/1995 | | |
| EP | 0840021 A1 | 5/1998 | | |
| EP | 1215401 A2 | 6/2002 | | |
| EP | 1503088 A1 | 2/2005 | | |
| EP | 1744063 A2 | 1/2007 | | |
| EP | 1832759 B1 | 4/2013 | | |
| EP | 2980421 A1 * | 2/2016 | | F16B 39/30 |
| JP | 2002347656 A | 12/2002 | | |
| WO | 200210595 A2 | 2/2002 | | |
| WO | WO-2008129854 A1 * | 10/2008 | | F16B 5/0233 |
| WO | 2010022841 A1 | 3/2010 | | |

* cited by examiner

Schnitt A-A

DEVICE FOR COMPENSATING FOR TOLERANCES

CROSS-REFERENCE TO RELATED APPLICATIONS

The present application claims priority to both German Patent Application No. 102018102291.3 that was filed Feb. 1, 2018 and German Patent Application No. 202018104330.7 that was filed Jul. 26, 2018, the contents of which are hereby incorporated by reference in their entirety.

TECHNICAL FIELD

The present disclosure relates to a device for compensating for tolerances between two parts to be screwed together, and an assembly having such a device.

BACKGROUND

A device for the bracing connection of parts spaced apart at a distance is known from DE 42 24 575 A1. The device from this prior art is made up of a relatively large number of individual components, which may entail high manufacturing costs. In addition, in the screwed-together state of the two parts, support takes place solely via the components of the device. The accuracy of the tolerance compensation is thus determined exclusively by the components of the device or the position of the individual components of the device relative to one another.

SUMMARY

Against the background described above, the object of the present invention is to provide a device for compensating for tolerances which has a simple design and is manufacturable with little complexity, and at the same time ensures improved accuracy of the tolerance compensation between two parts to be screwed together. A further object is to provide an assembly having such a device.

A device according to the invention for compensating for tolerances between two parts to be connected to one another by means of a connecting screw is particularly suited for vehicle parts. These include, for example, the connection of a vehicle light, instrument panel, roof railing, or a body part to a supporting part such as a frame structure of a vehicle.

A device according to the invention has a holding device for arrangement on a first part, and a compensation device that may be brought into contact with a second part and that is situated so as to be movable relative to the holding device. The holding device may thus be situated on a first part, and the compensation device may be brought into contact with a second part by moving the compensation device relative to the holding device.

According to the invention, it is now provided that the compensation device has an inner engagement structure for form-fit engagement with threads of the connecting screw. Such a design allows a targeted force flow between a connecting screw and the compensation device, so that the connecting screw or a section of the connecting screw may be used for maintaining the distance between the respective parts to be screwed together. It is thus possible on the one hand to reduce the number of components of a device according to the invention, and on the other hand to also reduce the manufacturing costs.

At the same time, a device according to the invention allows improved accuracy in the tolerance compensation between two parts to be screwed together. When there is support between two parts, a force flow may take place in particular via a section of the connecting screw. Thus, there is the option of bringing a connecting screw into engagement with the inner engagement structure of the compensation device and screwing it into a fastening nut that is fixedly connected to a first part. If the compensation device rests against a second part, in this way a force flow from the second part to the compensation element, to the connecting screw, and via the fastening nut to the first part may take place, and the relative distance between the two parts may thus be fixed with high accuracy and little effort.

Thus, the present invention also comprises a device for compensating for tolerances between two parts, in particular vehicle parts, that are to be connected by means of a fastening nut and a connecting screw that is screwed into the fastening nut, with a holding device for arrangement on a first part and a compensation device that may be brought into contact with a second part and that is situated so as to be movable relative to the holding device, the compensation device having an inner engagement structure for form-fit engagement with threads of the connecting screw, so that when the compensation device contacts the second part, a force flow takes place from the second part to the compensation device, to the connecting screw, and via the fastening nut to the first part.

The present invention further relates to a device for compensating for tolerances between two parts, in particular vehicle parts, that are to be connected by means of a connecting screw, with a holding device for arrangement on a first part, and a compensation device that may be brought into contact with a second part and that is situated so as to be movable relative to the holding device, the compensation device having an inner engagement structure for form-fit engagement with threads of the connecting screw, so that when the compensation device contacts the second part, a force flow takes place from the second part to the compensation device, to the connecting screw, and to the first part via an inner engagement structure that is formed and/or situated on the first part and/or fixedly connected to the first part, into which the connecting screw is screwed.

Providing a fastening nut on the first part is therefore not absolutely necessary. An inner engagement structure may also generally be provided that is formed and/or situated on the first part and/or fixedly connected to the first part. Such an inner engagement structure may likewise be designed for the form-fit engagement with threads of the connecting screw, the same as for the inner engagement structure of the compensation element.

The inner engagement structure of the first part is also preferably designed as an internal thread. Strictly as an example, an engagement structure that is formed and/or situated on the first part and/or fixedly connected to the first part is the internal thread of a fastening nut. Likewise, this may be the internal thread of a fastening element that is designed as a threaded sleeve or threaded nozzle. Such a fastening element may be fixedly connected to the first part, in particular in a force-fit, form-fit, and/or integrally joined manner. In addition, such a fastening element may protrude through an opening in the first part or be positioned axially adjacent to an opening in the first part. Furthermore, such a fastening element may have a collar-shaped section for support and/or for fastening to the first part.

Alternatively, instead of a fastening nut or a fastening element on the first part, an opening with an internal thread formed therein may be provided, into which a connecting screw may be screwed. Accordingly, an internal thread may be formed directly on the first part. The inner engagement structure of the first part is thus provided by a thread that is formed directly on the first part.

As mentioned above, according to the invention the compensation device has an inner engagement structure for form-fit engagement with threads of the connecting screw. According to the invention, this is also intended to include compensation devices in which an inner engagement structure for the form-fit engagement with threads of the connecting screw is formed only by screwing in a connecting screw. In such a design, the inner engagement structure for the form-fit engagement may thus be created by the threads of the connecting screw used in each case. In particular, a connecting screw in the compensation device may create an inner engagement structure in the form of a self-cutting thread.

According to the invention, there is also the option that the inner engagement structure of the compensation element is formed even before a connecting screw is screwed in, and is partially created by the screwing-in.

As mentioned above, an inner engagement structure may be provided on the first part. In this regard, there is also the option that the inner engagement structure of the first part is created only by screwing in a connecting screw. The inner engagement structure of the first part may thus be formed by the threads of the connecting screw used in each case. In particular, a connecting screw directly in the first part, or a component that is fixedly connected to the first part, may create an inner engagement structure in the form of a self-cutting thread. There is also the option that the inner engagement structure of the first part is formed even before a connecting screw is screwed in, and is partially created by the screwing-in.

According to one preferred embodiment, the inner engagement structure is designed for the form-fit support of a connecting screw along a longitudinal extension of the connecting screw, as the result of which particularly advantageous force transmission may be ensured by means of a connecting screw.

The longitudinal extension may in particular be the extent along a longitudinal axis of the connecting screw, the connecting screw being rotatable in particular about its longitudinal axis during screwing movements. Likewise, the holding device and/or the compensation device may have a longitudinal extension which may in particular be an extent along a longitudinal axis. The holding device and/or the compensation device may have a design that is essentially rotationally symmetrical about their/its longitudinal axis. In the screwed-together position, the longitudinal axes of the connecting screw, of the holding device, and/or of the compensation device may coincide.

The inner engagement structure is preferably designed as an internal thread, or as an internal thread at least in sections. The internal thread may more preferably be a standard and/or right-hand internal thread. A connecting screw may thus be brought into engagement with the inner engagement structure in a particularly simple manner. In the case of standard threads, the costs may be further reduced since standardized connecting screws may be used.

According to another embodiment of the device according to the invention, the compensation device and/or the holding device form/forms part of a worm gear, in particular when the inner engagement structure is engaged with threads of the connecting screw. The design of the compensation device and/or of the holding device as part of a worm gear allows in particular easy positioning of the compensation device relative to the holding device, or easy movement of the compensation device until it comes into contact with a second part.

According to another embodiment of the device according to the invention, the compensation device and the holding device are designed for transmitting pressure forces between the parts to be connected, in particular in a connected position of the parts. Accordingly, force transmission may take place via a connecting screw and also via the compensation device and the holding device, resulting in an overall advantageous force distribution. In particular, in this way excessive stress on the connecting screw, and thus a relatively small-surface introduction of force into the particular parts, is avoided.

It may also be advantageous for the compensation device to have a one-part design. This allows particularly cost-effective manufacture. For example, providing spring elements or clamping rings in the compensation device may be dispensed with.

It is also possible for the compensation device to have a multipart design, and/or to be made up of a plurality of elements that are fastened to one another and/or situated so as to be movable relative to one another and/or situated so as to be independently movable relative to the holding device. A high degree of functionality may thus be ensured, and the different elements may be designed specifically for the particular intended purpose.

It may also be advantageous for the compensation device and/or the inner engagement structure to be made of a metal material, at least in part, and/or of a plastic material, at least in part, and/or of a plurality of different materials. By use of a metal material, it is possible to transmit relatively large forces with particularly high operational reliability. When different materials are used, there is the option of using metal to manufacture elements that are subject to high stress, and to use plastic to manufacture other elements for reduction of costs. It is further preferred that the holding device is made of plastic, at least in part. Since for the force transmission, the holding device does not absolutely have to be inserted between the parts to be screwed together, merely using a cost-efficient plastic material may be sufficient.

More preferably, the compensation device and/or at least one element of the compensation device may be in guiding engagement with the holding device, in particular linearly and/or rotatably guided relative to the holding device. The relative movability of the compensation device and of the holding device may be suitably specified due to such guiding engagement or linear and/or rotatable guiding. The ease of handling is thus further improved. In particular, such guiding allows in a particularly advantageous manner the design of a worm gear for engagement of the inner engagement structure with threads of a connecting screw.

To provide such guiding, the compensation device and/or at least one element of the compensation device may have a guide means, in particular for linear guiding on the holding device and/or for guiding along a longitudinal extension of the holding device and/or for rotatable guiding on the holding device, and for guiding about a longitudinal extension or longitudinal axis of the holding device. Such a guide means may preferably be provided on outer circumferential surfaces or also on inner circumferential surfaces of the compensation device.

According to another embodiment, the holding device may have at least one guide structure for guiding the compensation device and/or individual elements of the compensation device. This ensures high operational reliability in the guiding of the compensation device or of the particular element of the compensation device. The guide structure may in particular be designed for linear guiding and/or for guiding along a longitudinal extension of the compensation device. This allows tolerance compensation between two parts without stress on the holding device, so that the holding device may be manufactured in a correspondingly cost-effective manner. In addition, the guide structure may also be designed for rotatable guiding and/or for guiding about a longitudinal extension or longitudinal axis of the compensation device. Such a guide structure may be used for axial positioning of the compensation device relative to the holding device, and at the same time may also be used for force transmission to the holding device for better force distribution between the two parts.

In the present context, linear guiding may be understood in particular to mean guiding that fixes a rotational position of the components guided relative to one another in each case, or longitudinal movability of the components without rotation about their longitudinal axis. In particular, a form-fit connection in the rotational orientation about the longitudinal axis of the components guided relative to one another may be achieved by linear guiding.

The at least one guide structure of the holding device may preferably be formed on an outer circumference and/or an inner circumference of the holding device, as the result of which a high degree of flexibility in the design of the mutually complementary elements may be ensured. In addition, there is the option for the holding device to have a plurality of guide structures, one guide structure preferably being formed on an outer circumference, and another guide structure being formed on an inner circumference, of the holding device. The particular guide structures may be designed with regard to different guide tasks, thus further improving the functionality of the device.

According to another preferred embodiment, the compensation device and/or at least one element of the compensation device are/is axially movable with respect to the holding device, in particular unscrewable from same, by rotation about a longitudinal axis and relative to the holding device. Thus, relative positioning between the compensation device and the holding device may be carried out, and the compensation device or the particular element of the compensation device may be brought into contact with the respective second part, with little effort. The operational reliability of the device is thus further improved.

It may also be advantageous for the compensation device and/or an element of the compensation device to have a frictional engagement means for creating frictional engagement with the connecting screw, in particular for transmitting a rotational movement of the connecting screw about its longitudinal axis to the compensation device and/or to at least one element of the compensation device.

Such a frictional engagement means may also be designed to temporarily establish a form-fit connection to a connecting screw. Consequently, this may be a frictional engagement means and/or form-fit engagement means. In particular, an initially established form-fit connection may transition into a frictional engagement means by deformation of the particular material section in the course of screwing in a connecting screw.

For example, a connecting screw to be used in each case may be brought into engagement with the inner engagement structure of the compensation element, in particular by screwing into an inner engagement structure of the compensation device that is designed as an internal thread. In an end area of the inner engagement structure, for example at a thread end, a constriction may be provided that allows the connecting screw to be screwed in further only with increased application of force. The frictional engagement means thus provides resistance to further screwing of the connecting screw into the compensation device. Due to this resistance, a rotational movement of the compensation device or of the particular element of the compensation device relative to the holding device may be brought about with only minor effort. For example, unscrewing the compensation device from the holding device may thus be carried out by an operator with little effort.

The frictional engagement means also ensures that after the compensation device is brought into contact with a second part, force-fit bracing of the compensation device with the second part takes place, thus increasing the accuracy of the tolerance compensation and maintenance of the relative positions of each of the two parts to be screwed together.

Thus, when the frictional engagement means provides resistance to further screwing in of the connecting screw into the compensation device, the frictional engagement means may establish a force-fit connection. Frictional engagement with the connecting screw cannot occur until the connecting screw is screwed in further, past the frictional engagement means, and the accompanying deformation of the frictional engagement means takes place. In references to a frictional engagement means below, this may always involve a frictional engagement means and/or form-fit engagement means.

It is also preferred that the holding device and/or an element of the compensation device may have a screw support means that is designed for axial support on the connecting screw, in particular until a predefined axial force transmitted by the connecting screw is reached. Due to such a screw support means, the situation may be avoided that the connecting screw is inadvertently or prematurely screwed into a counter nut of a first part, or that this takes place when the relative position between the compensation device and the holding device is not yet set. The screw support means may in particular ensure that a linear movement of the compensation device or of the particular element of the compensation device takes place due to a rotational movement of the connecting screw in the supported state. In this case the connecting screw and the inner engagement structure of the compensation device form a worm gear, so that due to screwing movements of the connecting screw, the compensation device easily moves relative to the holding device and may be brought into contact with a second part. The holding device may preferably have a one-part design, as the result of which the manufacturing costs may preferably be reduced. In addition, the holding device may be designed at least for rotatably fixed fastening to the first part, and in particular the holding device may be designed to be completely fixed to the first part. In this case, all movement orientations of the holding device would be limited relative to a first part. The holding device in this case may particularly advantageously provide a holding functionality, for example for the purpose of linear guiding of the compensation device.

For this type of fastening to a first part, the holding device may have fastening means, in particular shaped elements for form-fit engagement with a first part. Such shaped elements may be barbed hooks or snap-in hooks, for example. The holding device may preferably be made of a plastic material, in particular in an injection molding process, which may be implemented with little complexity.

According to one embodiment, the compensation device may have at least one screw engagement element on which the inner engagement structure is formed. The compensation device may be made up solely of a screw engagement element that includes the inner engagement structure. It is also possible for the compensation device to include further elements that are in functional connection with the screw engagement element. The screw engagement element is preferably made of a metal material, and is thus suited for transmitting relatively large forces.

According to one preferred design, the compensation device may have a holding engagement element that is in guiding engagement with the holding device, in particular linearly or rotatably guided. The holding engagement element may thus be designed specifically for the functionality of the guiding engagement with the holding device, whereas the screw engagement element may be designed specifically for the functionality of the engagement with the connecting screw. The holding engagement element and the screw engagement element may be fixedly connected to one another. The holding engagement element may enclose the screw engagement element, at least in sections, and/or may surround same. The screw engagement element and the holding engagement element may be made of different materials. The holding engagement element may in particular be made of a plastic material, as the result of which, for example, extrusion of the screw engagement element may be carried out with little complexity.

The screw engagement element may also preferably be designed as a sleeve element and/or ring element, on the inner circumference of which the inner engagement structure is formed. The screw engagement element may also have an end-face surface and/or a flange for contact with a second part, as the result of which a force-fit connection between the screw engagement element and the second part may be established in a particularly advantageous manner. An end-face surface or a flange for contact with a second part may likewise be provided on the holding engagement element.

The screw engagement element is particularly preferably designed as a screw nut, in particular a hexagon nut, more preferably as a standard hexagon nut. A screw nut having an external geometry that differs from the hexagonal shape, for example a triangular nut or square nut, may also be used as a screw engagement element. Such a nut is inexpensive and ensures high operational reliability. The inner engagement structure may be formed in particular by the internal thread of a screw nut, it preferably being possible for the external shape of the screw nut to form a guide means for linear guiding on the holding device. Thus, there is the option to use the outer surfaces or edges of a nut for suitable guiding in the holding device.

In addition to the design as a screw nut, the screw engagement element may have some other shape that ensures a form-fit engagement at its outer circumference. It is also possible for the screw engagement element to have a circular external geometry. This applies in particular for embodiments according to which the screw engagement element, at least in sections, is enclosed by a holding engagement element and/or fixedly connected thereto. The screw engagement element may thus be connected to the holding engagement element in a force-fit manner, for example by extrusion coating or press fitting.

The holding device may preferably have an inner circumferential shape for the form-fit accommodation of a hexagon nut, in particular for a form-fit connection in a rotational orientation about the longitudinal axis of a hexagon nut. The hexagon nut is thus supported on the holding device in the rotational direction, while a longitudinal movement of the nut relative to the holding device is possible. Accordingly, a guide structure of the holding device is designed for linear guiding of a hexagon nut, in particular for guiding along the longitudinal axis of a hexagon nut. A hexagon nut may thus be easily moved out of the holding device, namely, by screwing in the connecting screw.

More preferably, the compensation device may have a support element that is connected between the holding device on the one hand and the screw engagement element and/or the holding engagement element on the other hand. The support element may be situated so as to be movable relative to the holding device, relative to the screw engagement element, and/or relative to the holding engagement element. The support element may in particular ensure support between the holding device and the screw engagement element or the holding engagement element, so that the force flow may be advantageously distributed in the fastened position. Thus, there is the option to generate a force flow on the one hand via the particular connecting screw that is used, and on the other hand to generate a force flow to the holding device via the support element. The tolerance compensation may thus take place with increased accuracy and reliability.

The support element may be designed in a particularly advantageous manner for supporting the screw engagement element and/or the holding engagement element along a longitudinal extension of the screw engagement element and/or of the holding engagement element, and/or for limiting movement in the direction of a first part. The support element may be moved together with the screw engagement element and/or the holding engagement element relative to the holding device, and thus brought into the fastening position. There is also the option of carrying out the motion sequence sequentially, for example by initially moving the screw engagement element and/or the holding engagement element relative to the holding device, and subsequently moving the support element relative to the holding device and/or bringing it into contact with the screw engagement element and/or the holding engagement element.

More preferably, the holding engagement element may form a receptacle for the support element and/or for the holding device, thus making an overall compact design possible.

For this purpose, the holding engagement element may have wall sections that extend inside one another and/or parallel to one another, in particular concentrically, and that define an interspace for accommodating the support element and/or the holding device. The wall sections extending in parallel may be connected to one another via a connecting wall section, which in particular may form a longitudinal delimitation of the receptacle or the interspace.

It may also be advantageous for the compensation device to have slope support surfaces and/or for the holding device to have counterslope support surfaces. The slope support surfaces of the compensation device may preferably be designed to be supported on counterslope support surfaces of the holding device.

The slope support surfaces are preferably a guide means for rotatable guiding on the holding device. More preferably, the counterslope support surfaces may form a guide structure for rotatable guiding of the compensation device and/or at least one element of the compensation device. The rotation of the compensation device relative to the holding device may thus easily generate a linear displacement, which in particular ensures high operational reliability of the device.

It may also be advantageous when an anti-twist lock is formed on the slope support surfaces and/or on the counterslope support surfaces, which blocks or enables rotation of the compensation device relative to the holding device as a function of a relative position between the compensation device and the holding device, in particular along a longitudinal orientation. For example, the anti-twist lock may be released by relative movement of the compensation device in a longitudinal orientation away from the holding device or toward a second part. Accordingly, the anti-twist lock may assume a blocking position during a relative movement of the compensation device in a longitudinal orientation toward the holding device or away from a second part. In such a blocking position, rotation of the compensation device relative to the holding device is blocked or at least impeded.

Such an anti-twist lock may be formed, for example, by shaped elements and/or friction elements that engage in one another. The shaped elements may be formed in a complementary manner on the slope support surfaces of the compensation device and on the counterslope support surfaces of the holding device. In particular in a fastening position, undesirable rotation of the compensation device relative to the holding device may be avoided, and the fastening security may thus be increased.

The slope support surfaces may be formed in particular on an outer circumference or on an end-face end of the compensation device, in particular of the screw engagement element, of the holding engagement element, or of the support element. The counterslope support surfaces may be formed on an inner circumference or on an end-face end of the holding device. It is likewise possible for the counterslope support surfaces to also be formed on an outer circumference of the holding device.

In the formation of slope support surfaces and counterslope support surfaces on inner or outer circumferences, the individual components of the device may advantageously extend in one another or be accommodated by one another, which facilitates a compact design.

The slope support surfaces and counterslope support surfaces of the compensation device and the holding device are preferably designed as a left-hand thread, more preferably with a thread pitch that corresponds to the thread pitch of the inner engagement structure designed as an internal thread. If a support element on which the slope support surfaces are formed is provided, with the same thread pitch it is possible in a particularly easy manner to simultaneously unscrew the support element and the screw engagement element. Thus, on the one hand a screw thread is formed by the connecting screw that is screwed into the screw engagement element, and on the other hand the support element together with the holding device may form a worm gear. If the thread pairs now each have the same thread pitch, the support element may be moved synchronously with the screw engagement element relative to the holding device.

According to another embodiment, the slope support surfaces of the compensation device may be formed by mutually facing thread flanks having different shapes, and/or the counterslope support surfaces of the holding device may be formed by mutually facing thread flanks having different shapes. In this way, the differently shaped thread flanks in each case may provide different functions. The anti-twist lock may be formed, for example, via the shape of at least one of the thread flanks. One of the thread flanks of the holding device may be provided with protrusions and/or recesses, for example, which may be brought into engagement with corresponding protrusions and/or recesses of an oppositely situated thread flank of the compensation device. In contrast, the respective other thread flanks may be designed for rotatable guiding of the compensation device.

The thread engagement between the compensation device and the holding device may be designed with play along a longitudinal orientation of the compensation device or holding device, so that defined relative movability between the compensation device and the holding device between a blocked and enabled position is provided.

A further aspect of the present invention relates to an assembly, in particular for a motor vehicle, having two parts: a device according to the above description that is situated between the parts, and the connecting screw; the parts are screwed together via the connecting screw, and the connecting screw is in engagement with the inner engagement structure of the device. The above discussion similarly also applies to the assembly according to the invention.

According to one preferred embodiment of the assembly, the connecting screw for screwing the two parts together is screwed into an inner engagement structure that is formed and/or situated on the first part and/or fixedly connected to the first part. This may in particular be an inner engagement structure for form-fit engagement with threads of the connecting screw, for example an internal thread.

More preferably, the connecting screw for screwing the two parts together may be screwed into a fastening nut or into a fastening element having an internal thread, in particular a threaded sleeve or threaded nozzle. The fastening nut or the fastening element may be situated on the first part and/or is fixedly, in particular immovably, connected to the first part. A particularly advantageous support functionality for the connecting screw may be provided in this way.

It may likewise be advantageous when the connecting screw for screwing the two parts together is screwed into an internal thread of the first part, in particular into an internal thread that is formed in an opening in the first part. This allows an overall compact design with only a small number of components.

More preferably, the compensation device, in particular in a screwed-together position of the two parts, may rest against the second part, and a force flow may take place and/or be introducible from the second part to the compensation device, to the connecting screw, and to the first part via the inner engagement structure that is formed and/or situated on the first part and/or fixedly connected to the first part.

In particular, it is possible for the compensation device to rest against the second part, and for a force flow to take place and/or be introducible from the second part to the compensation device, to the connecting screw, and via the fastening nut or via the fastening element, to the first part.

It is likewise possible for the compensation device to rest against the second part, and for a force flow to take place and/or be introducible from the second part to the compensation device, to the connecting screw, and via the internal thread that is formed on the first part, to the first part.

BRIEF DESCRIPTION OF THE DRAWINGS

The invention is described below by way of example with reference to the appended figures, which schematically illustrate the following.

DETAILED DESCRIPTION

Figure 1A:
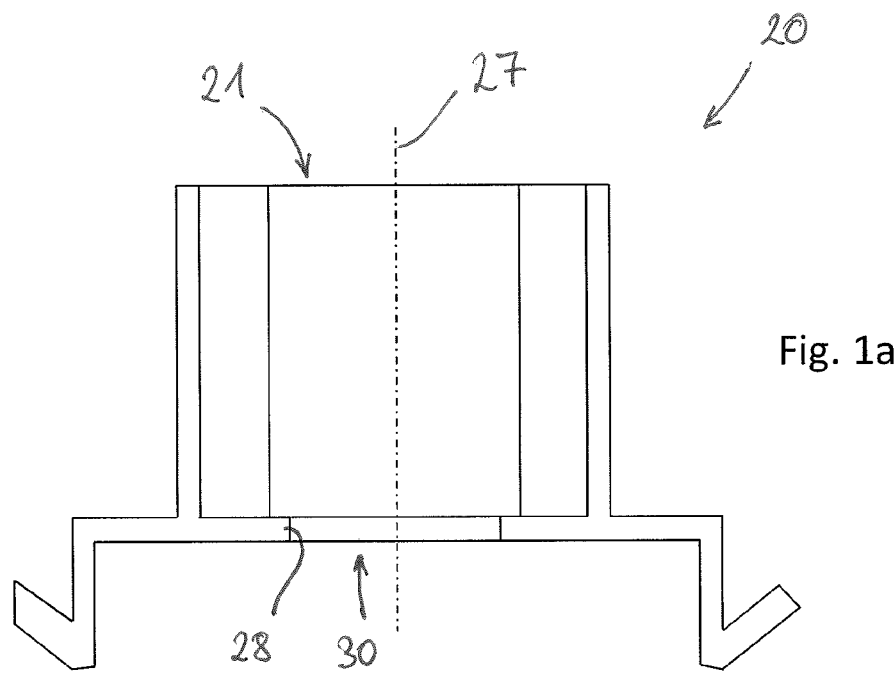
FIG. 1a shows a sectional illustration of a holding device according to the invention, according to a first variant.
Figure 1B:
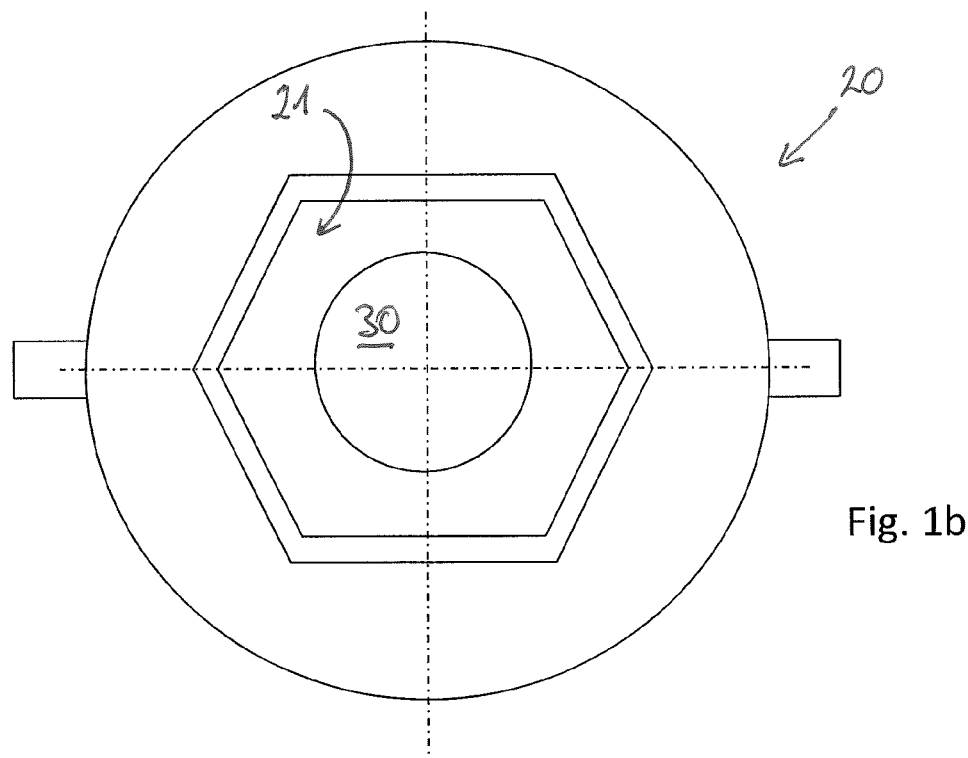
FIG. 1b shows a top view of the holding device from FIG. 1a, FIG. 2a shows a sectional illustration of a compensation device according to the invention, according to a first variant.
Figure 2A:
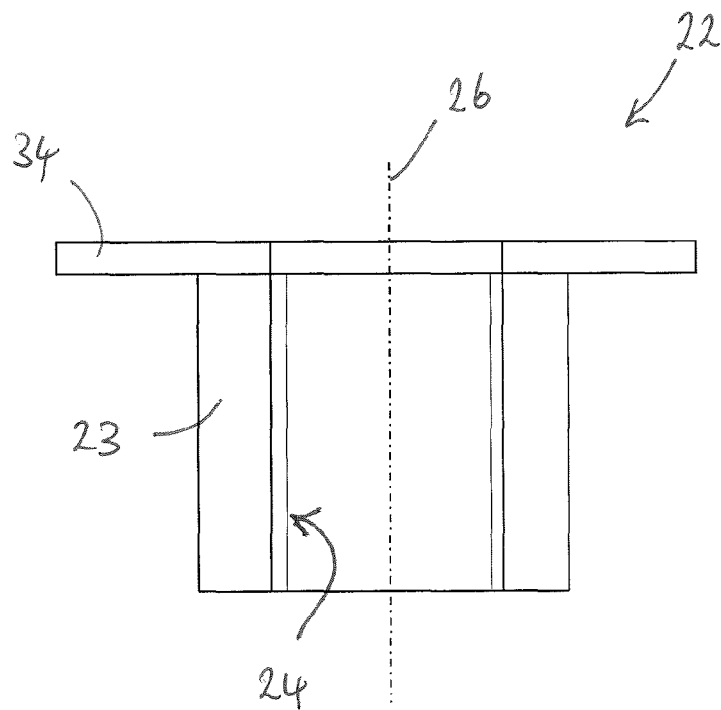
FIG. 2b shows a top view of the compensation device from FIG. 2a, FIG. 3a shows a sectional illustration of a compensation device according to the invention, according to a second variant.
Figure 2B:
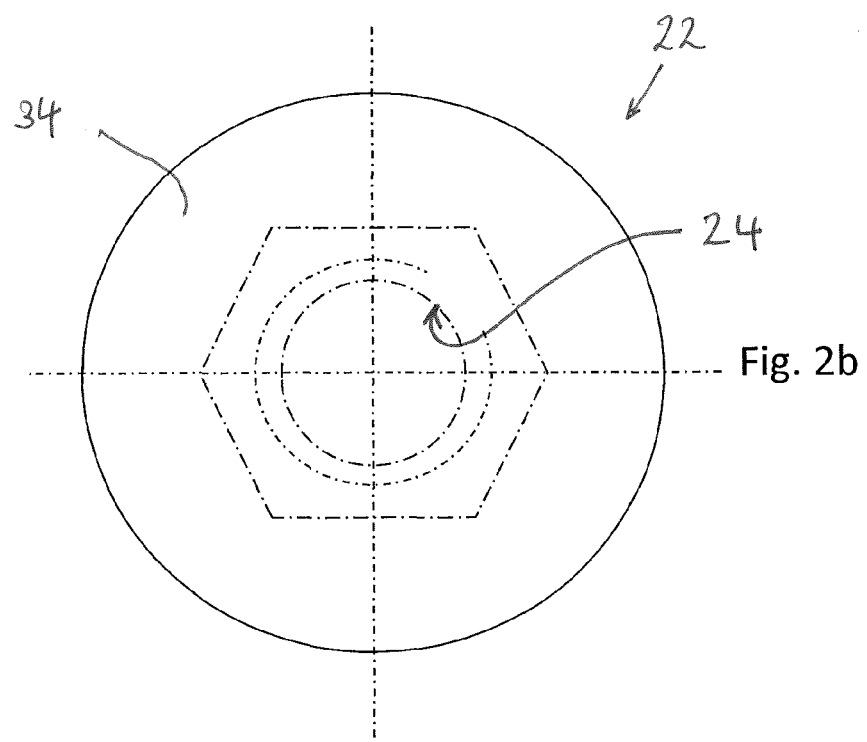

FIGS. 1a and 1b show sectional illustrations of a holding device 20 according to a first variant. Such a holding device 20 may form part of a device 10 according to the invention for compensating for tolerances, as shown in FIGS. 4 through 7, for example. FIGS. 2a and 2b show sectional illustrations of a compensation device 22 according to the invention, according to a first variant. Such a compensation device 22 may likewise form part of a device 10 according to the invention for compensating for tolerances, as shown in FIGS. 4 through 7, for example.

Figure 3A:
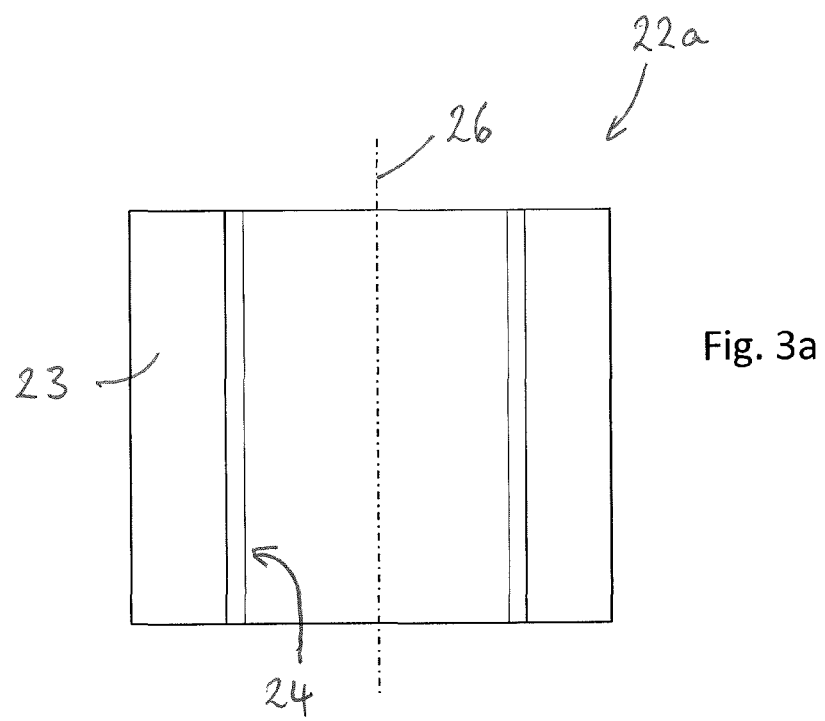
FIG. 3b shows a top view of the compensation device from FIG. 3a, FIG. 4 shows a sectional illustration of a device according to the invention according to a first embodiment, with a holding device from FIG. 1a and a compensation device from FIG. 2a in an arrangement between two parts.
Figure 3B:
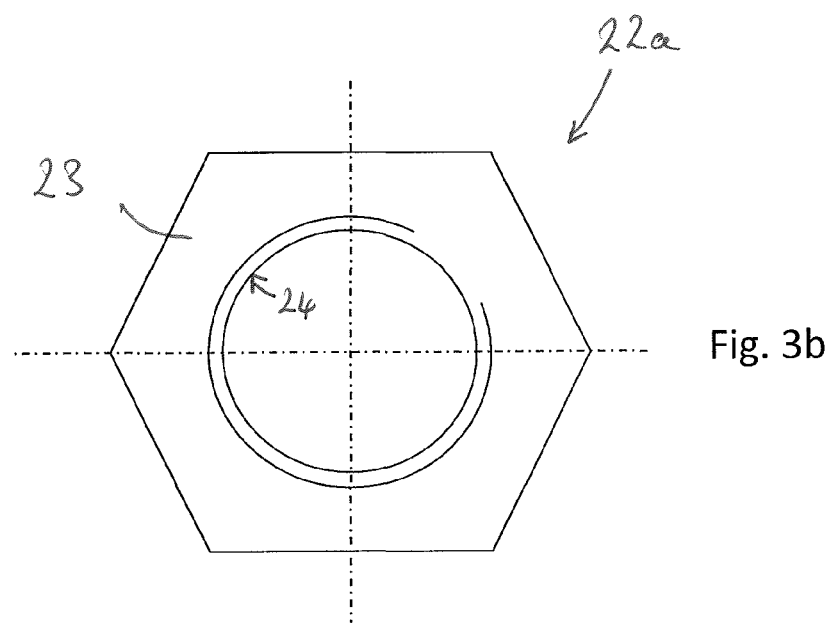

FIGS. 3a and 3b show sectional illustrations of a compensation device 22a, according to a second variant. The compensation device 22a according to FIGS. 3a and 3b may also be part of a device 10 according to the invention for compensating for tolerances, which, however, is not shown in FIGS. 4 through 7.

FIGS. 4 through 7 show schematic illustrations of a device 10 for compensating for tolerances, according to a first embodiment. The device 10 is designed to compensate for tolerances between two parts to be screwed together, in particular a first part 12 and a second part 14. The parts 12 and 14 may in particular be vehicle parts, for example a body part and a supporting part.

Figure 5:
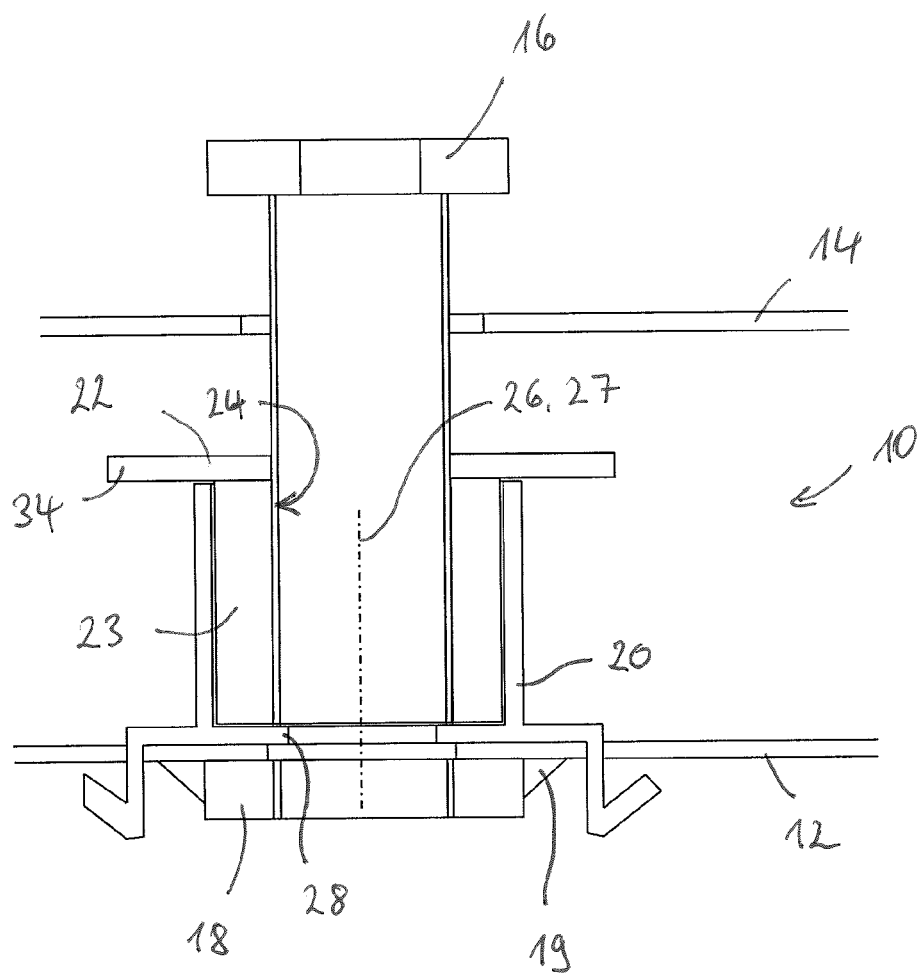
FIG. 5 shows a sectional illustration of the device from FIG. 4, in an arrangement between two parts and with a connecting screw inserted.
Figure 6:
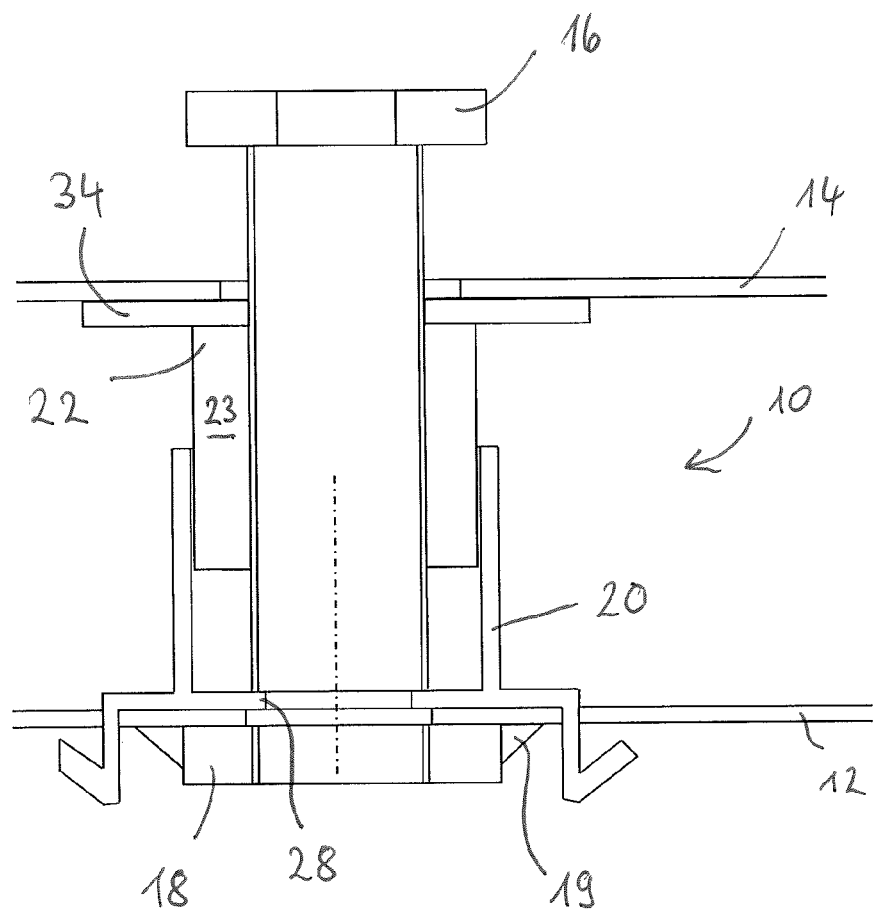
FIG. 6 shows a sectional illustration of the device from FIG. 5 with the compensation device lifted.
Figure 7:
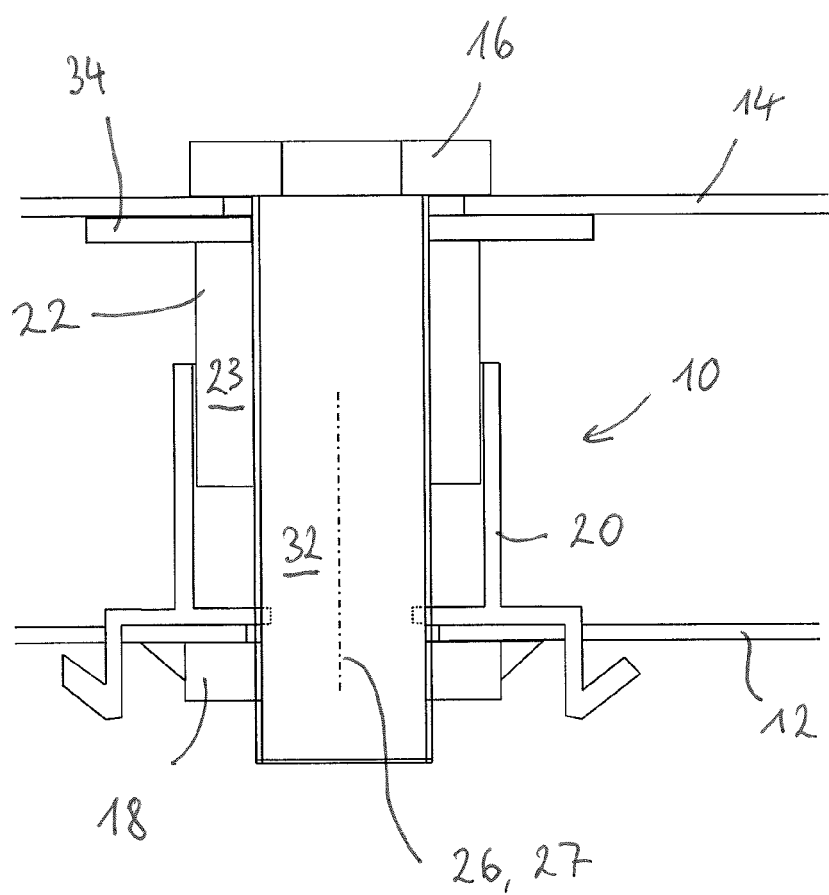
FIG. 7 shows a sectional illustration of the device from FIG. 6 in an arrangement between two screwed-together parts.

The parts 12 and 14 may be screwed together with a connecting screw 16 as shown in the sequence of FIGS. 5 through 7. For this purpose, for example a fastening nut 18 is situated on the first part 12, in particular fixedly connected to the first part 12. The fastening nut 18 may be welded to the first part 12, preferably on a side of the first part 12 facing away from the second part 14. A weld seam between the first part 12 and the fastening nut 18 has been provided with reference numeral 19.

The device 10 includes the holding device 20 according to FIGS. 1a and 1b for arrangement on a part 12, and the compensation device 22 according to FIGS. 2a and 2b for contact with a second part 14, the compensation device being situated so as to be movable relative to the holding device 20. The compensation device 22 has an inner engagement structure 24 for form-fit engagement with threads of the connecting screw 16. The inner engagement structure 24 is in particular an internal thread or a standard internal thread.

FIG. 5 shows the device 10 in an arrangement between the parts 12 and 14, with the connecting screw 16 screwed in. By screwing the connecting screw 16 into the inner engagement structure 24 designed as an internal thread, the connecting screw 16 along its longitudinal extension may be supported in a form-fit manner on the inner engagement structure 24.

As described above, the device 10 according to the first embodiment in FIGS. 4 through 7 has a holding device 20 according to FIGS. 1a and 1b and a compensation device 22 according to FIGS. 2a and 2b. The device 10 may likewise also be equipped with a compensation device 22a according to FIGS. 3a and 3b, which, however, is not illustrated here.

The compensation device 22 has a hexagon nut 23 and a flange section 34 that adjoins the hexagon nut 23. The flange section 34 is used for contact with the second part 14, and may be fixedly connected to the hexagon nut 23. The flange section 34 may be designed in particular as a washer. The compensation device 22a according to the second variant, as illustrated in FIGS. 3a and 3b, is made up solely of a hexagon nut 23.

Figure 4:
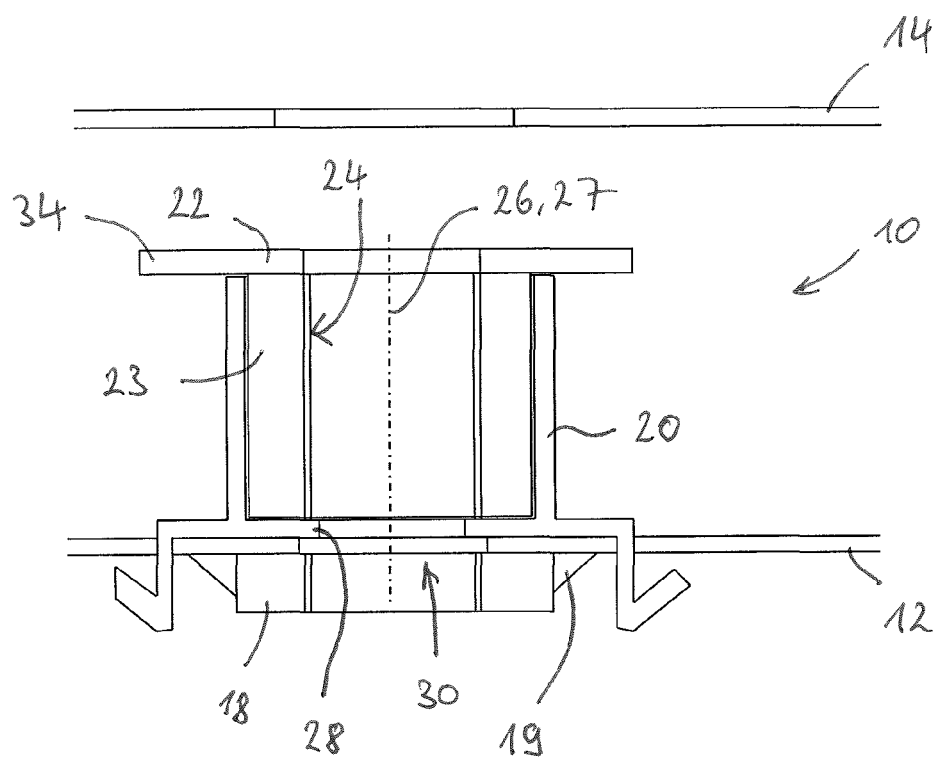

The holding device 20 forms a receptacle 21 for the hexagon nut 23 of the compensation device 22. In particular, the hexagon nut 23 may be linearly guided by the holding device 20. For the linear guiding, the holding device 20 may have an inner circumferential shape that corresponds to the external shape of the hexagon nut 23. Accordingly, the hexagon nut 23 of the compensation device 22 may be fixed in a rotational position, in particular about a longitudinal axis 26 of the compensation device 22, by guiding engagement with the holding device 20. At the same time, as shown in FIGS. 6 and 7, the hexagon nut 23 along its longitudinal axis 26 may be at least partially moved out of an inserted position in the holding device 20 as shown in FIGS. 4 and 5. The longitudinal axis 26 of the compensation device 22 may coincide with a longitudinal axis 27 of the holding device 20, and also with the longitudinal axis of the connecting screw 16 in the screwed-together state.

The operating principle of the device 10 is now explained with reference to FIGS. 4 through 7. For use, the device 10 is to be situated between two parts 12 and 14 to be screwed together. A connecting screw 16 is to be led through an opening in the second part 14 and screwed into the hexagon nut 23 of the compensation device 22, in particular into the inner engagement structure 24 designed as an internal thread of the hexagon nut 23. The holding device 20 has a screw support means 28 on which the connecting screw 16 is supported upon further screwing into the hexagon nut 23. The screw support means 28 may be a collar that delimits a through opening 30 in the holding device 20.

In the supported position of the connecting screw 16 on the screw support means 28, screwing the connecting screw 16 further into the hexagon nut 23 causes the hexagon nut to be moved linearly in the direction of the second part 14, i.e., out of the holding device 20. The connecting screw 16 together with the hexagon nut 23 and the holding device 20 thus forms a worm gear. In this way, the compensation device 22 as a whole may be moved in the direction of the second part 14.

As soon as the flange section 34 contacts the second part 14, as shown in FIG. 6, further screwing in of the connecting screw 16 generates an axial force on the screw support means 28. When a predefined axial force is exceeded, the supporting effect of the screw support means 28 is overcome, and the connecting screw 16 may penetrate the through opening 30 and ultimately come into engagement with the fastening nut 18 in order to screw the parts 12 and 14 together. In the area of the through opening 30, the connecting screw is in engagement or in contact with a material section of the holding device 20 that has been formed by deformation of the screw support means 28 or that adjoins same. Since the holding device 20 is preferably made of plastic and the connecting screw 16 is preferably made of metal, an advantageous material pairing results in the area of the through opening 30. In particular, a securing function for the position of the connecting screw 16 may be provided by the plastic material of the holding device 20.

A completely screwed-together position of the two parts 12 and 14 is shown in FIG. 7. The hexagon nut 23 has been partially moved out of the holding device 20, and the flange section 34 has been brought into contact with the second part 14. Completely moving the hexagon nut 23 out of the holding device 20 is to be avoided in order to maintain the rotational position of the hexagon nut 23 by engagement with the holding device.

As is further apparent from FIG. 7, the connecting screw 16 is simultaneously in engagement with the internal thread of the hexagon nut 23 and with the internal thread of the fastening nut 18. The connecting screw 16 itself may thus ensure a supporting function between the parts 12 and 14, in particular via a section 32 of the connecting screw 16 extending between the hexagon nut 23 and the fastening nut 18. A force flow, starting from the second part 14, may thus extend via the hexagon nut 23, the section 32 of the connecting screw 16, and lastly, via the fastening nut 18 to the first part 12.

At the same time, the tightening torque of the connecting screw 16 brings about a force flow from the hexagon nut 23 via the flange section 34, through the second part 14 until reaching the head of the connecting screw 16. The second part 14 is thus clamped between the flange section 34 and the head of the connecting screw 16.

The distance between the hexagon nut 23 and the fastening nut 18 is thus fixed due to the engagement of the connecting screw 16 and due to the fixed rotational position of the hexagon nut 23 and the fastening nut 18 in each case. The relative position of the parts 12 and 14 is therefore likewise fixed.

In the device 10 according to the first embodiment in FIGS. 4 through 7, a transport securing means may be provided for the compensation device 22. The purpose of such a transport securing means is to prevent the compensation device 22 from undesirably falling out of or coming loose from the holding device 20 prior to the particular use of the device 10, in particular prior to arranging between the two parts 12 and 14. Such a transport securing means may be formed, for example, by situating the hexagon nut 23 in the holding device 20 with frictional engagement, in particular via a press fit between the hexagon nut 23 and the holding device 20. Such a press fit may be designed in such a way that the hexagon nut 23 is prevented from undesirably falling out, while the hexagon nut 23 may still be easily moved out of the holding device 20, with the connecting screw 16 screwed in, in a position in which the hexagon nut is supported on the screw support means 28, as described above.

Figure 8:
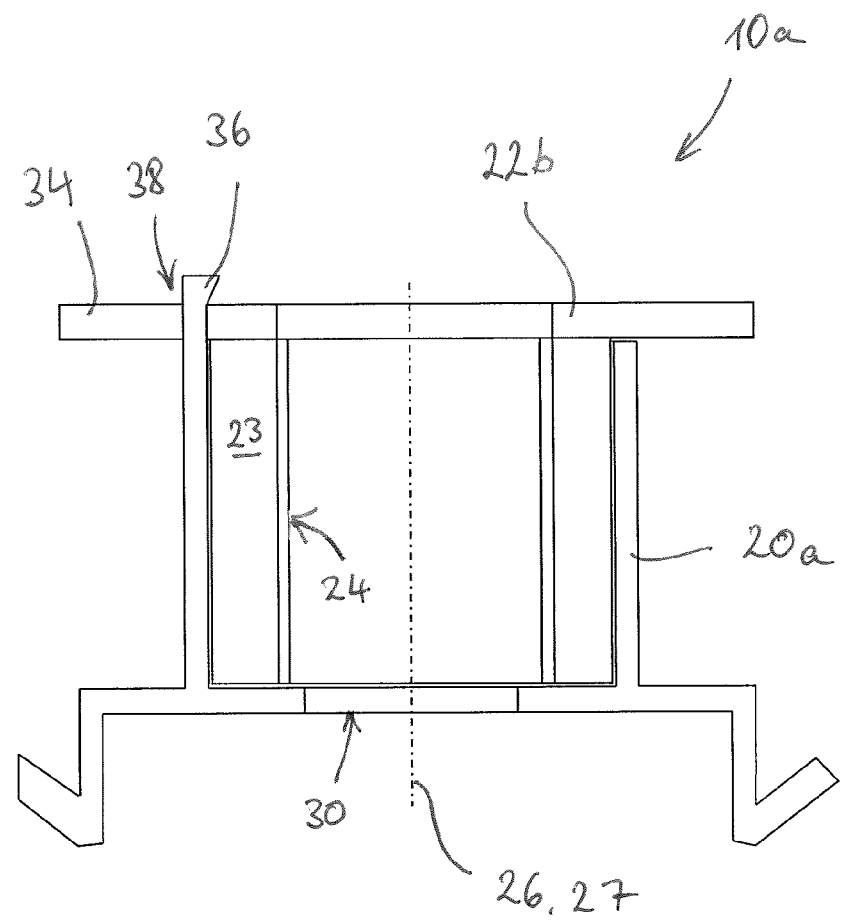
FIG. 8 shows a sectional illustration of a device according to the invention according to a second embodiment, with a holding device according to a second variant and a compensation device according to a third variant.

FIG. 8 shows a schematic sectional illustration of a device 10a according to the invention, according to a second embodiment, with a holding device 20a according to a second variant and a compensation device 22b according to a third variant. The device 10a according to the second embodiment differs from the device 10 according to the first embodiment via the design of the transport securing means. For this purpose, the holding device 20a has a protrusion 36. The protrusion 36 is designed to engage behind the compensation device 22b. The compensation device 22b may have a recess 38 through which the protrusion 36 may protrude in order to engage behind the compensation device 22b. A position of the compensation device 22b when inserted into the holding device 20a may thus be maintained until desired moving of the compensation device 22b out of the holding device 20a is initiated by screwing the parts 12 and 14 together, as described above with reference to the device 10.

Besides the transport securing by the protrusion 36 and the recess 38, in the device 10a according to the second embodiment it is also possible to provide a press fit between the hexagon nut 23 of the compensation device 22b and the holding device 20a in order to further reduce the risk of the compensation device 22b inadvertently falling out.

Figure 9A:
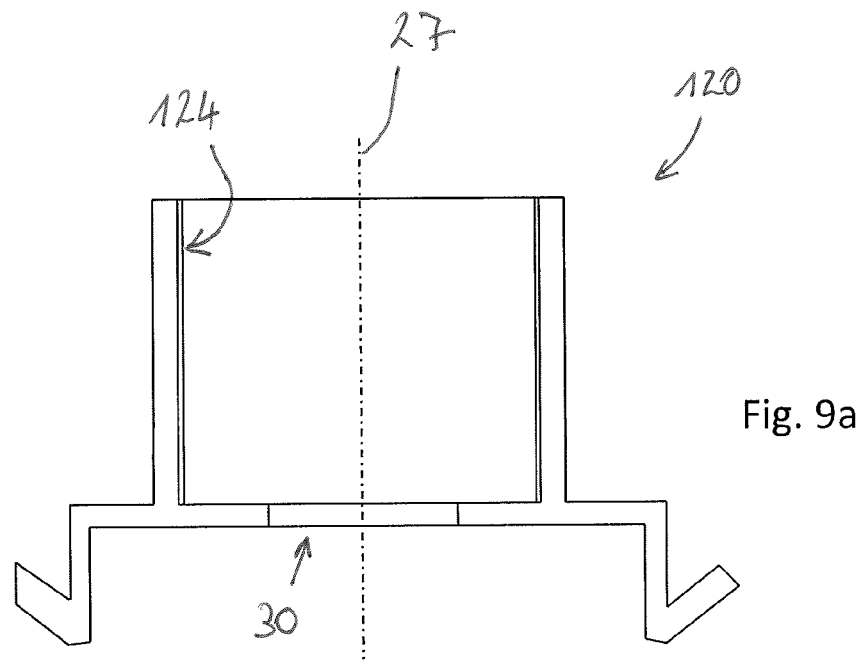
FIG. 9a shows a sectional illustration of a holding device according to the invention according to a third variant.
Figure 9B:
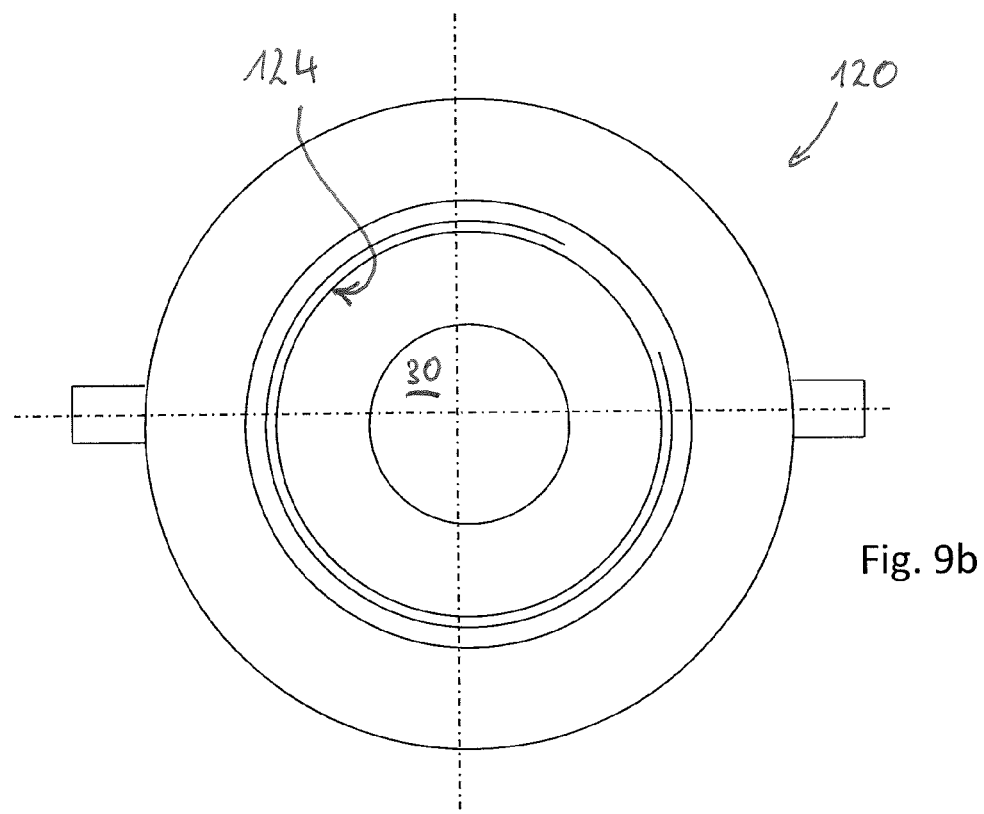
FIG. 9b shows a top view of the holding device from FIG. 9a, FIG. 10a shows a sectional illustration of a compensation device according to the invention according to a fourth variant.
Figure 10A:
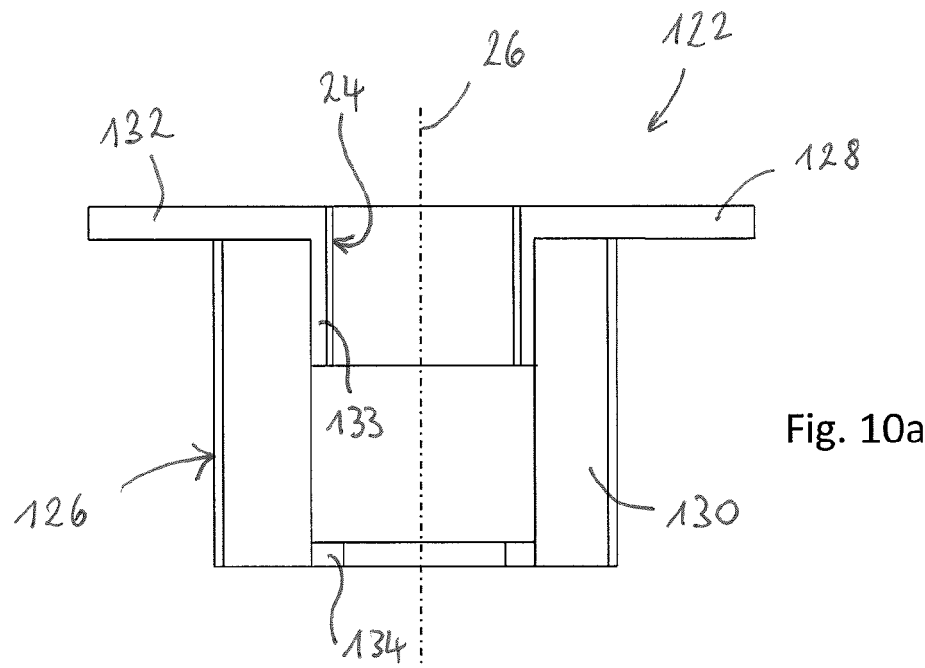
FIG. 10b shows a top view of the compensation device from FIG. 10a, FIG. 11a shows a sectional illustration of a screw engagement element, according to the invention, of the compensation device from FIG. 10a, FIG. 11b shows a sectional illustration of a holding engagement element, according to the invention, of the compensation device from FIG. 10a, FIG. 12 shows a sectional illustration of a device according to the invention according to a third embodiment, with a holding device from FIG. 9a and a compensation device from FIG. 10a in an arrangement between two parts.
Figure 10B:
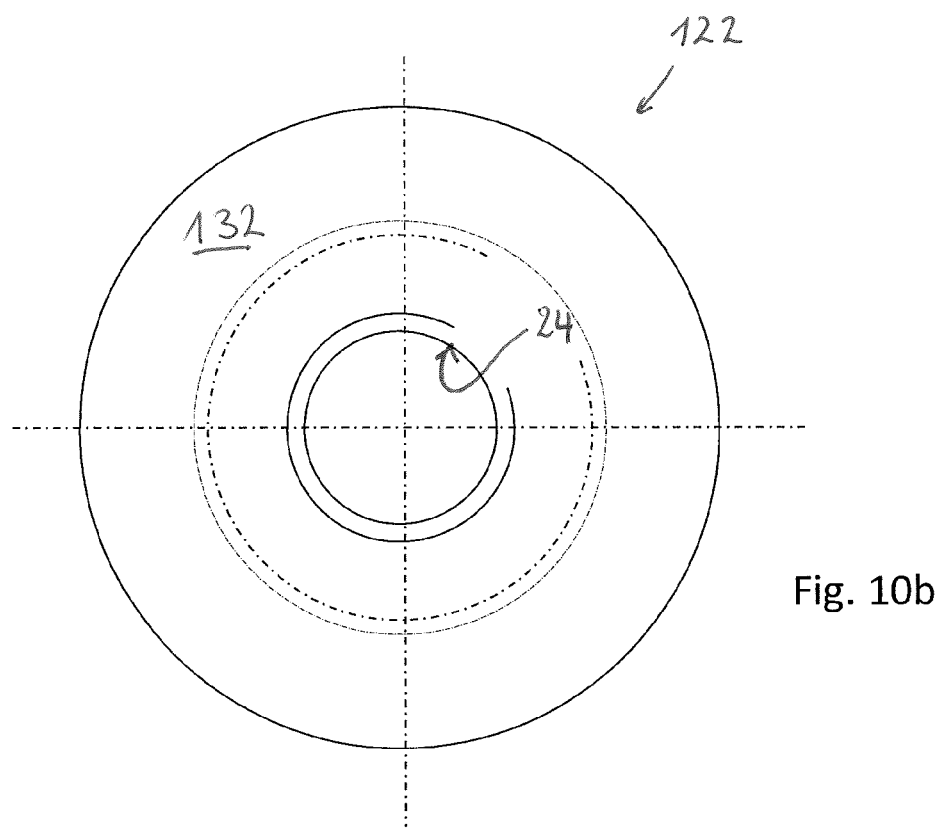

FIGS. 9a and 9b show sectional illustrations of a holding device 120 according to the invention, according to a third variant. Such a holding device 120 may form part of a device 100 according to the invention for compensating for tolerances according to a third embodiment, as shown in FIGS. 12 through 15, for example. FIGS. 10a and 10b show sectional illustrations of a compensation device 122 according to the invention, according to a fourth variant. Such a compensation device 122 may likewise form part of a device 100 according to the invention for compensating for tolerances according to a third embodiment, as shown in in FIGS. 12 through 15, for example.

Figure 11A:
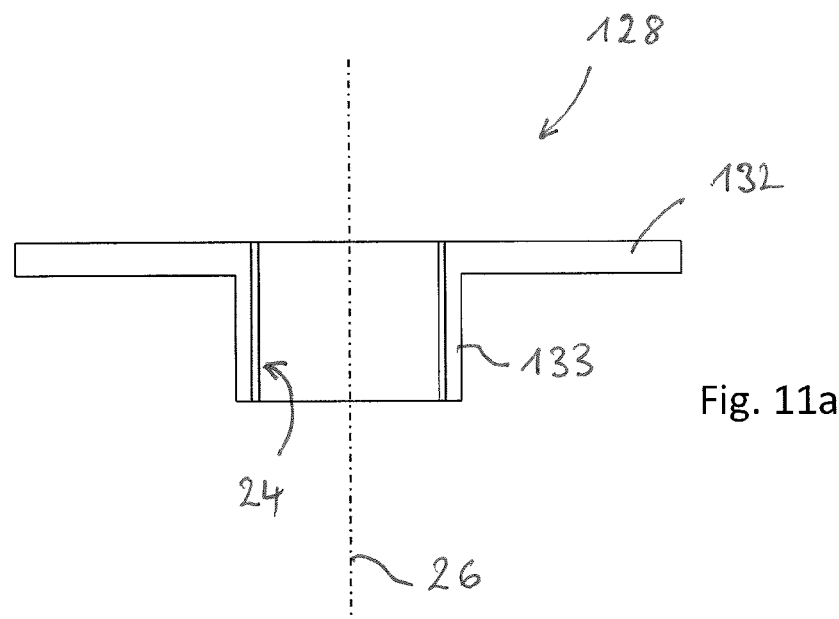
Figure 11B:
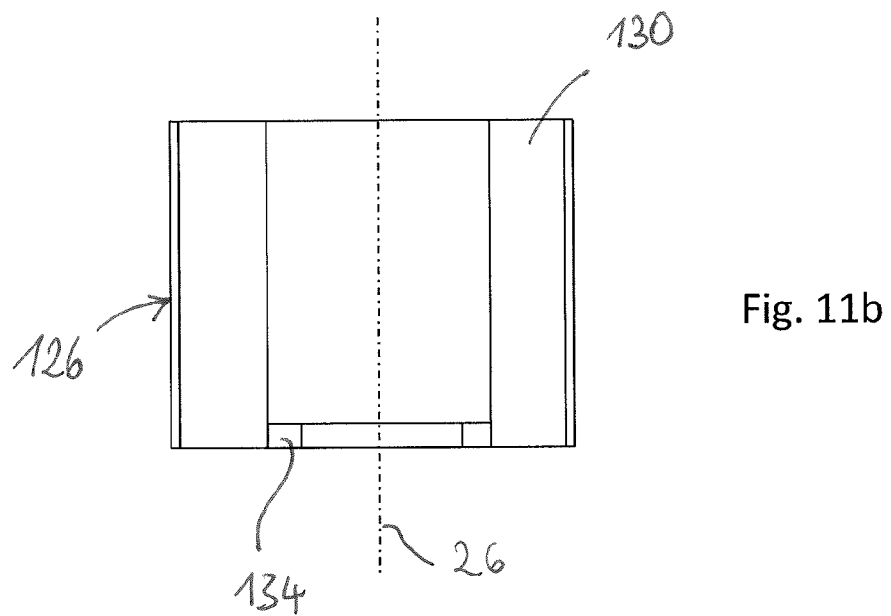

Lastly, FIG. 11a shows a sectional illustration of a screw engagement element 128, according to the invention, of the compensation device 122 from FIG. 10a, and FIG. 11b shows a sectional illustration of a holding engagement element 130, according to the invention, of the compensation device 122 from FIG. 10a.

In a position shown in FIG. 10a, the screw engagement element 128 may be fixedly connected to the holding engagement element 130, for example via a force-fit, form-fit, and/or integrally joined connection. In addition, a flange section 132 for contact with a second part 14 may be formed on the screw engagement element 128. A sleeve section 133 may adjoin the flange. The sleeve section 133 may be inserted into the holding engagement element 130 in order to connect the screw engagement element 128 and the holding engagement element 130.

FIGS. 12 through 15 show schematic illustrations of a device 100 for compensating for tolerances according to a third embodiment. The device 100 includes the holding device 120 as shown in FIGS. 9a and 9b, and the compensation device 122 as shown in FIGS. 10a and 10b. An inner engagement structure 24 in the form of an internal thread is formed on the compensation device 122. The inner engagement structure 24 may be formed on the flange section 132 and/or on the sleeve section 133.

Alternatively, there is the option to additionally form the inner engagement structure 24 on the holding engagement element 130, which is not shown here. An inner engagement structure 24 that is formed on the holding engagement element 130 may be in flush alignment with an inner engagement structure 24 that is formed on the flange section 132 and/or on the sleeve section 133. In addition, an inner engagement structure 24 that is formed on the holding engagement element 130 may already be provided before a connecting screw 16 is screwed in, or may be provided only by screwing in a connecting screw 16. The latter option may be achieved, for example, by the frictional engagement means 134 having a longer design and in particular extending to the sleeve section 133.

By providing an inner engagement structure 24 on the holding engagement element 130, which in particular may be made of plastic, there is the option for manufacturing the screw engagement element 128, which may be made of metal, in a more cost-efficient manner. In particular, the screw engagement element 128 may be designed with a relatively short inner engagement structure 24, since a portion of the force transmission may be ensured via the inner engagement structure 24 of the holding engagement element 130. The screw engagement element 128 could also be formed only by the flange section 132 or have a relatively short sleeve section 133, for example.

Lastly, there is also the option to form the inner engagement structure 24 solely on the holding engagement element 130. Instead of the screw engagement element 128, it would then be possible to provide a washer, with or without the sleeve section 133. This may be achieved in a particularly cost-effective manner.

The compensation device 122 is rotatably guided relative to the holding device 120. The rotatable guiding is achieved by a thread engagement. For this purpose, an internal thread 124 that is in engagement with an external thread 126 of the compensation device 122 may be formed on an inner circumferential surface of the holding device 120. The internal thread 124 and the external thread 126 may be left-hand threads.

The compensation device 122 may have a multipart design and, as described above with reference to FIGS. 11a and 11b, may include a screw engagement element 128 and a holding engagement element 130. The inner engagement structure 24 may be formed on the screw engagement element 128, and the external thread 126 may be formed on the holding engagement element 130. The holding engagement element 130 may enclose the screw engagement element 128, at least in sections, and may be made of a different material than the screw engagement element 128. In particular, the screw engagement element 128 is made of a metal material and the holding engagement element 130 is made of a plastic material.

The compensation device 122 also includes a frictional engagement means 134 for creating frictional engagement with the connecting screw 16. The frictional engagement means 134 is formed on an end section of the inner engagement structure 24 opposite from the flange section 132. This ensures that the connecting screw 16 is initially screwed into the inner engagement structure 24, and only upon further screwing in is frictional engagement with the frictional engagement means 134 created.

Figure 12:
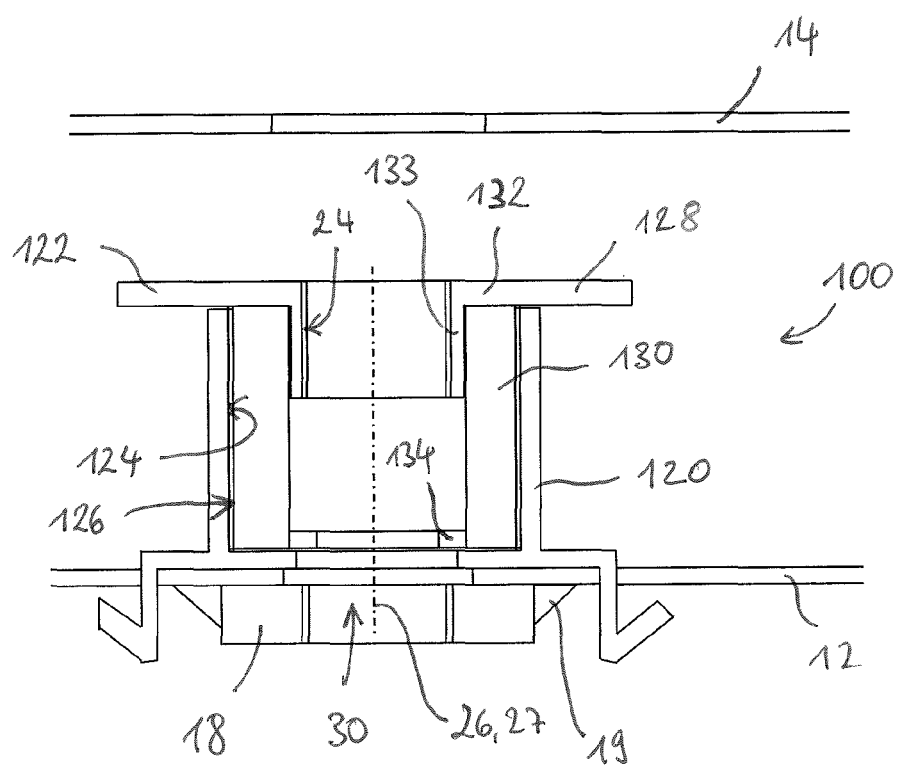
Figure 13:
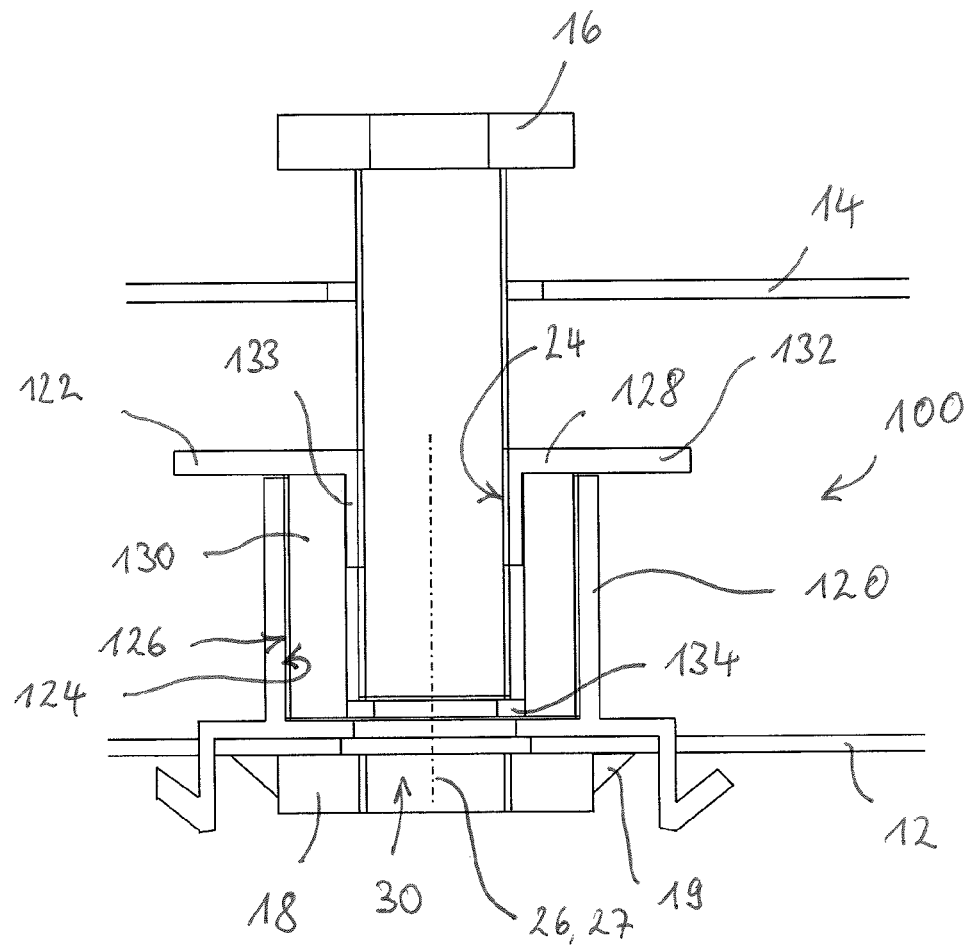
FIG. 13 shows a sectional illustration of the device from FIG. 12 in an arrangement between two parts and with a connecting screw inserted.

The operating principle of the device 100 is now explained with reference to FIGS. 12 through 15. For use, the device 100 is to be situated between two parts 12 and 14 to be screwed together, as shown in FIG. 12. A connecting screw 16 having a right-hand thread is to be led through an opening in the second part 14 and screwed into the compensation device 122, in particular into the inner engagement structure 24 designed as an internal thread. Screwing the connecting screw 16 further in brings its end sections into contact with the frictional engagement means 134, as shown in FIG. 13, and frictional engagement with the compensation device 122 may be created.

When frictional engagement is present between the connecting screw 16 and the compensation device 122, a further screwing movement of the connecting screw 16 causes the compensation device 122 to be rotated relative to the holding device 120, which in particular is rotatably fixedly fastened to the first part 12. Due to the rotatable guiding via a left-hand thread, such a rotational movement of the compensation device 122 causes it to be moved in the direction of the second part 14, in particular to be unscrewed from the holding device 120. Accordingly, the connecting screw 16 together with the compensation device 122 and the holding device 120 forms a worm gear.

Figure 14:
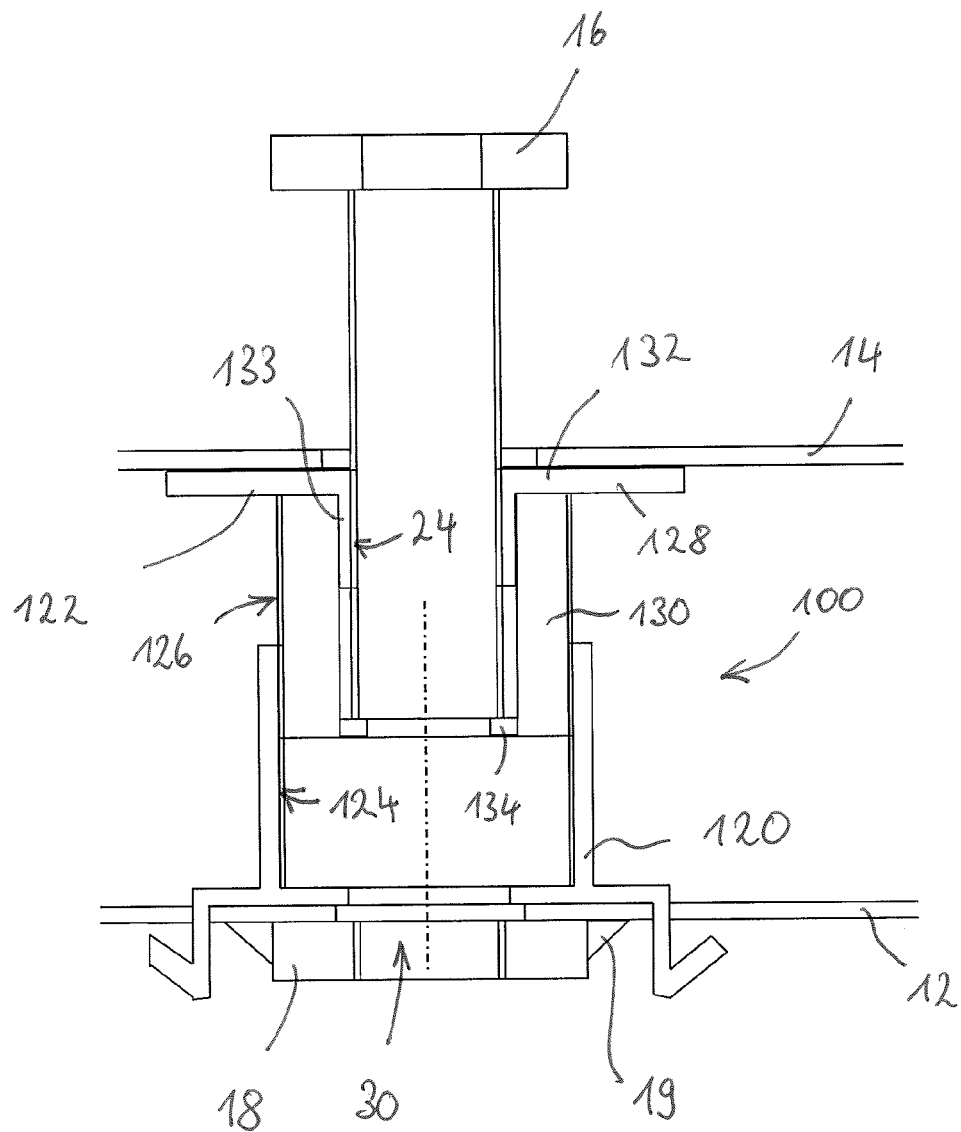
FIG. 14 shows a sectional illustration of the device from FIG. 13 in an arrangement between two parts and with the compensation device unscrewed from the holding device.

As soon as the compensation device 122 has come into contact with the second part 14, as shown in FIG. 14, further screwing in of the connecting screw 16 results in the frictional engagement being overcome, so that the connecting screw 16 may be further screwed in through the compensation device 122. The connecting screw 16 may ultimately penetrate the through opening 30 in the first part 12 and come into engagement with the fastening nut 18 in order to screw the parts 12 and 14 together.

Figure 15:
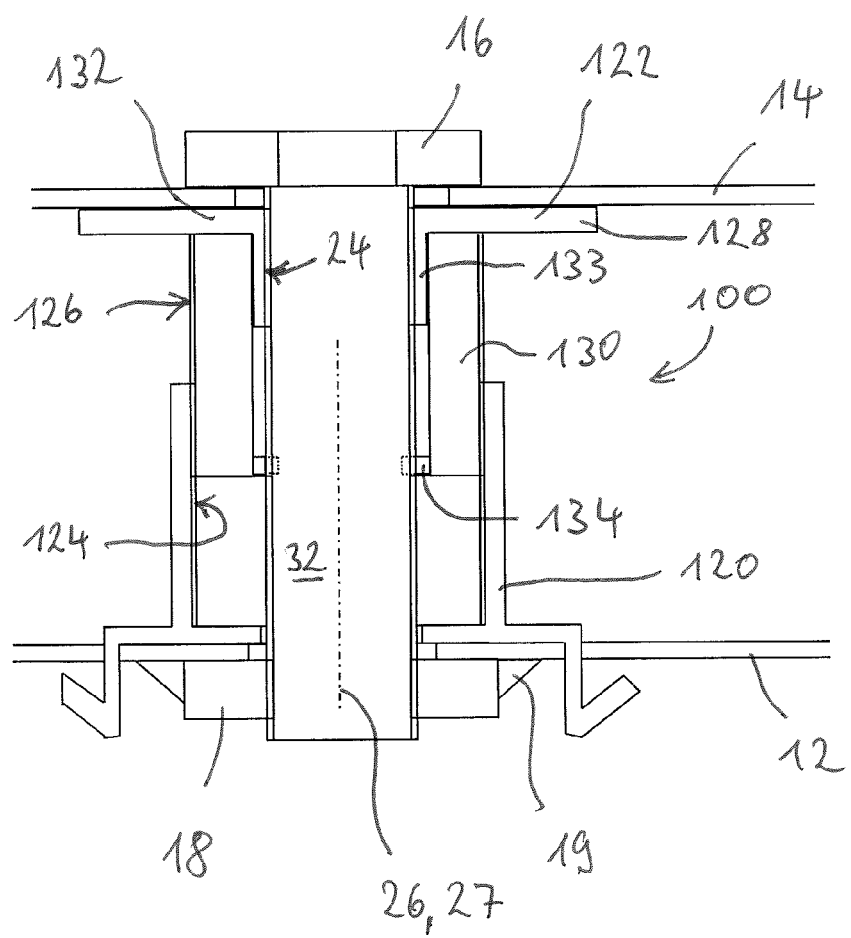
FIG. 15 shows a sectional illustration of the device from FIG. 14 in an arrangement between two screwed-together parts.

A completely screwed-together position of the two parts 12 and 14 using the device 100 is shown in FIG. 15. The compensation device 122 has been unscrewed from the holding device 120 and brought into contact with the second part 14. The connecting screw 16 is thus simultaneously in engagement with the internal thread of the compensation device 122 and with the internal thread of the fastening nut 18. This in turn ensures a force flow via the section 32 of the connecting screw 16, which extends between the compensation device 122 and the fastening nut 18. In addition, the device 100 allows a force flow via the holding device 120 to the first part 12, thus ensuring a particularly good force distribution.

FIGS. 16 through 20 show schematic illustrations of a device 100a for compensating for tolerances according to a fourth embodiment. The device 100a has a holding device 120a according to a fourth variant and a compensation device 122a according to a fifth variant.

The device 100a according to the fourth embodiment differs from the device 100 according to the third embodiment in that the holding device 120a has a screw support means 136. The screw support means 136 is used to support the connecting screw 16 after screwing it into the screw engagement element 128. The screw support means 136 may be a collar that delimits a through opening 152 in the holding device 120a. The screw support means 136 of the holding device 120a may be provided in addition or as an alternative to the frictional engagement means 134 of the compensation device 122a, the frictional engagement means 134 being illustrated by way of example in FIGS. 16 through 20.

In the device 100a according to the fourth embodiment as shown in FIGS. 16 through 20, an anti-twist lock, described in greater detail below, may be provided between the holding device 120a and the compensation device 122a. Such an anti-twist lock may also be provided in the device 100 according to the third embodiment as shown in FIGS. 12 through 15, even though this has not been described in greater detail above in conjunction with the third embodiment.

Figure 21A:
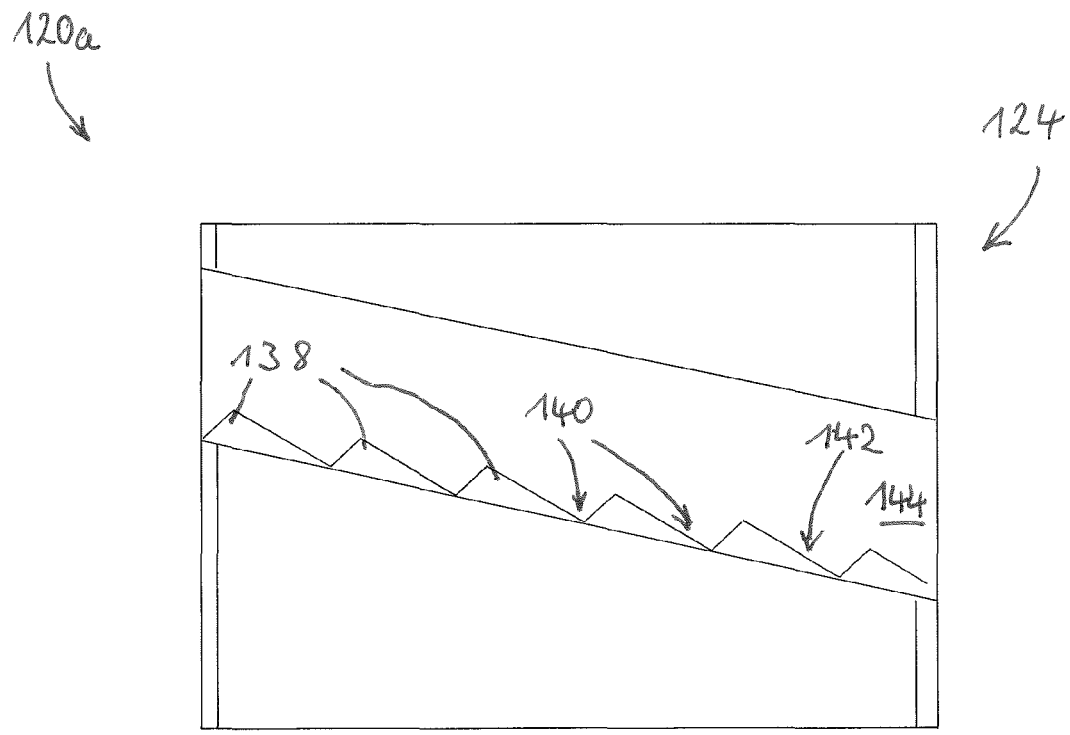
FIG. 21a shows a schematic side view of an internal thread of the holding device according to the fourth variant.
Figure 21B:
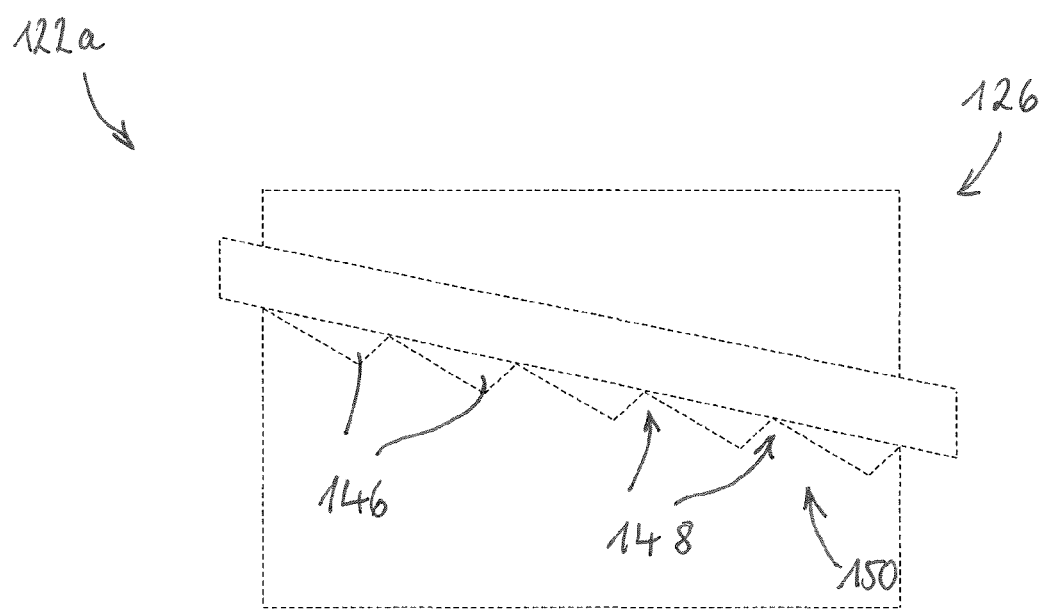
FIG. 21b shows a schematic side view of an external thread of the compensation device according to the fifth variant.

The anti-twist lock between the holding device 120a and the compensation device 122a may be formed by thread flanks of the internal thread 124 having different designs, and thread flanks of the external thread 126 having different designs, as schematically illustrated in FIGS. 21a and 21b. FIG. 21a shows a schematic side view of the internal thread 124 of the holding device 120a, and FIG. 21b shows a schematic side view of the external thread 126 of the compensation device 122a.

As shown in FIG. 21a, the internal thread 124 may be provided with protrusions 138 and/or recesses 140. The protrusions 138 and/or recesses 140 may be formed on a thread flank 142 that faces the second part 14 in a fastening position of the device 100a between the parts 12 and 14. A thread 144 is formed adjoining the thread flank 142.

In addition, it is apparent from FIG. 21b that the external thread 126 may be provided with protrusions 146 and/or recesses 148. The protrusions 146 and/or recesses 148 may be formed on a thread flank 150 that faces away from the second part 14 in a fastening position of the device 100a between the parts 12 and 14.

Figure 22A:
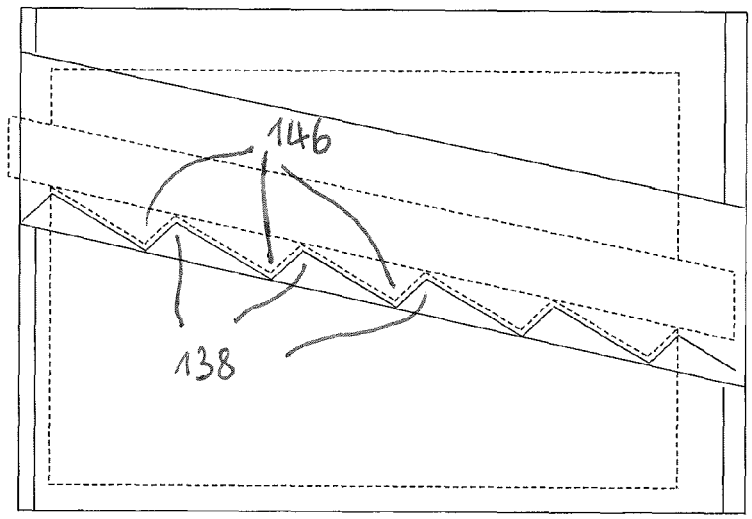
FIG. 22a shows a schematic side view of a thread engagement between the internal thread from FIG. 21a and the external thread from FIG. 21b.
Figure 22B:
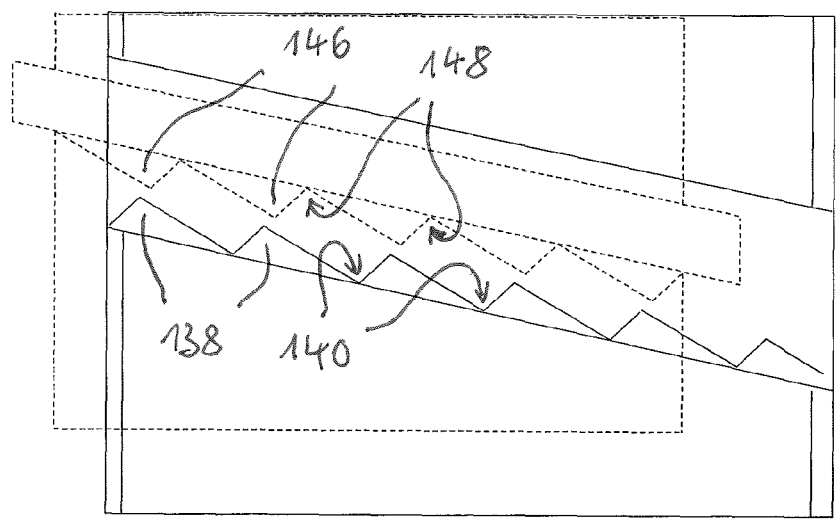
FIG. 22b shows a schematic side view of the thread from FIG. 22a in a lifted position of the compensation device.

FIGS. 22a and 22b show schematic side views of a thread engagement between the internal thread 124 from FIG. 21a and the external thread 126 from FIG. 21b, the internal thread 124 being illustrated with solid lines and the external thread 126 being illustrated with dashed lines. Play may be present between the internal thread 124 and the external thread 126, so that limited longitudinal movability is present between the compensation device 122a and the holding device 120a, regardless of a rotational position between the compensation device 122a and the holding device 120a. Due to this relative longitudinal movability, the respective protrusions 138 and/or recesses 140 of the internal thread 124 may be brought into and out of engagement with the respective protrusions 146 and/or recesses 148 of the external thread 126. In FIG. 22a the protrusions 138, 146 and recesses 140, 148 are engaged. In FIG. 22b the compensation device 122a is in the lifted position, so that the protrusions 138, 146 and recesses 140, 148 are disengaged.

The protrusions 138, 146 and/or recesses 140, 148 thus form an anti-twist lock that enables or blocks rotation of the compensation device 122a relative to the holding device 120a as a function of the position of these elements relative to one another. In an enabled position, the respective other thread flanks may ensure low-friction guiding of the compensation device 122a relative to the holding device 120a.

The protrusions 138 and/or recesses 140 of the internal thread 124 and/or the protrusions 146 and/or recesses 148 of the external thread 126 may have an asymmetrical design in each case. A different characteristic of the anti-twist lock may thus be provided for opposite rotational orientations. The shape of the particular protrusions and/or recesses may also be selected in such a way that for one rotational orientation an anti-twist lock is provided, and for the respective opposite rotational orientation, sliding of the respective protrusions and/or recesses is facilitated, so that reaching a lifted position as shown in FIG. 22b may be simplified.

Figure 16:
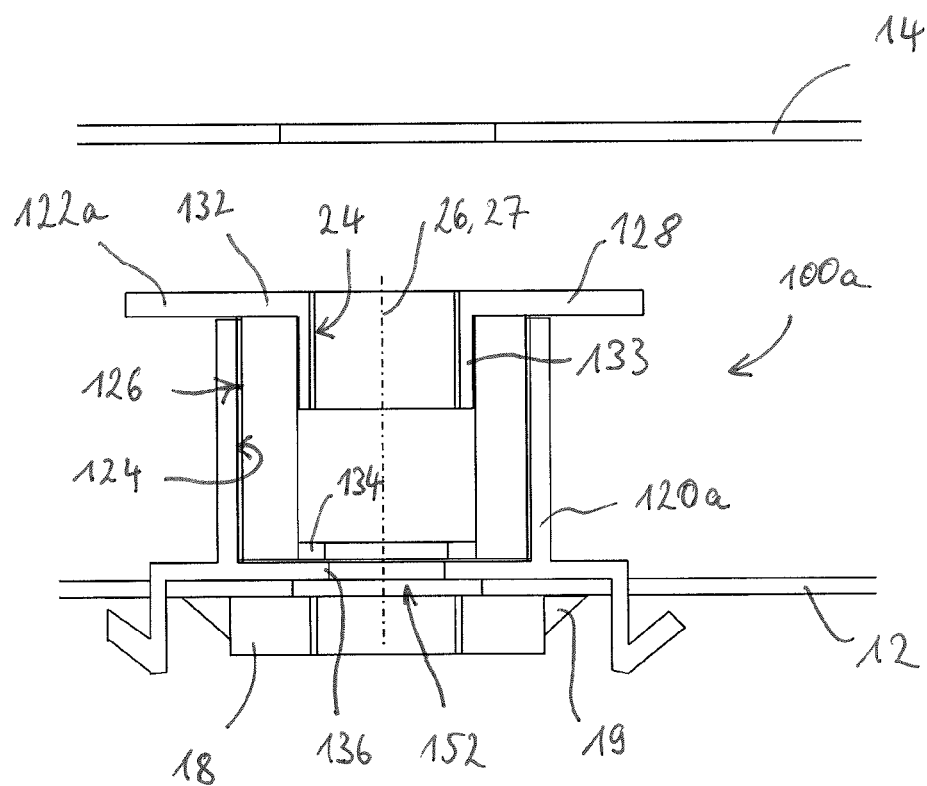
FIG. 16 shows a sectional illustration of a device according to the invention according to a fourth embodiment, with a holding device according to a fourth variant and a compensation device according to a fifth variant in an arrangement between two parts.
Figure 17:
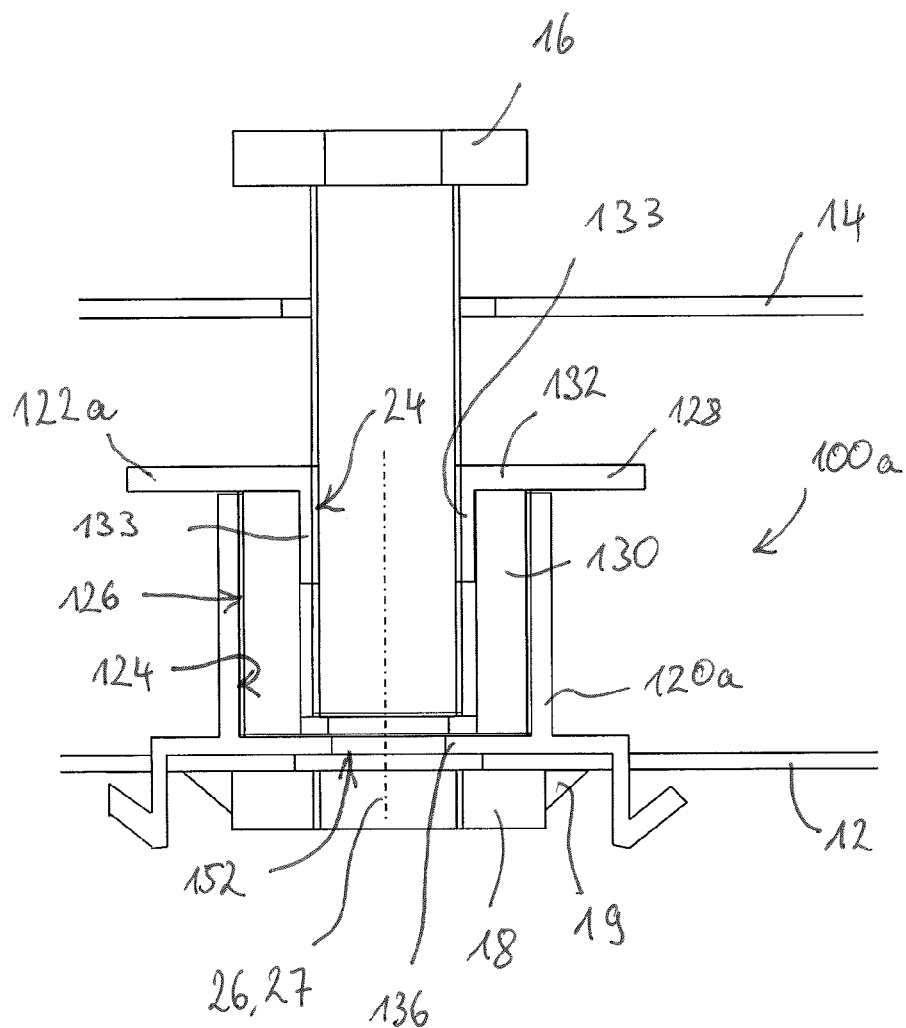
FIG. 17 shows a sectional illustration of the device from FIG. 16 in an arrangement between two parts and with a connecting screw inserted.

The operating principle of the device 100a is now explained with reference to FIGS. 16 through 23. For use, the device 100a is to be situated between two parts 12 and 14 to be screwed together, as shown in FIG. 16. A connecting screw 16 having a right-hand thread is to be led through an opening in the second part 14 and screwed into the compensation device 122a, in particular into the inner engagement structure 24 designed as an internal thread. By further screwing in of the connecting screw 16, its end section comes into contact with the frictional engagement means 134, as shown in FIG. 17, and frictional engagement with the compensation device 122a may be created.

When the connecting screw 16 is screwed in, a blocked state may initially be present between the compensation device 122a and the holding device 120a due to the anti-twist lock, as schematically illustrated in FIG. 22a. In addition, when frictional engagement is present between the connecting screw 16 and the compensation device 122a, in particular via the frictional engagement means 134, rotation of the compensation device 122a relative to the holding device 120a may be prevented due to the anti-twist lock.

By screwing the connecting screw 16 further into the compensation device 122a, the connecting screw 16 may reach a supporting position on the screw support means 136. In the supported position of the connecting screw 16 on the screw support means 136, further screwing in of the connecting screw 16 causes the compensation device 122a to be moved linearly in the direction of the second part 14, i.e., away from the holding device 120a. This linear relative movement may take place in particular within the scope of thread play that is present, resulting in release of the anti-twist lock.

Figure 18:
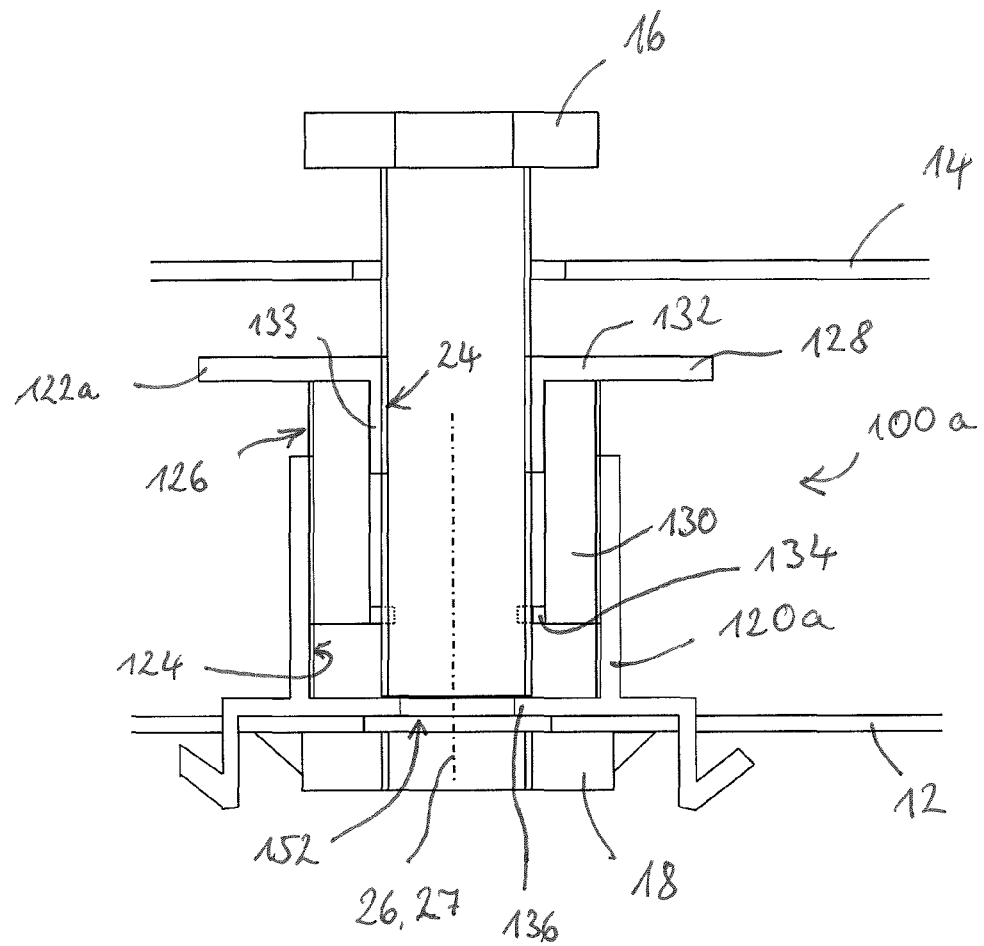
FIG. 18 shows a sectional illustration of the device from FIG. 17 in an arrangement between two parts and with the compensation device partially unscrewed from the holding device.
Figure 19:
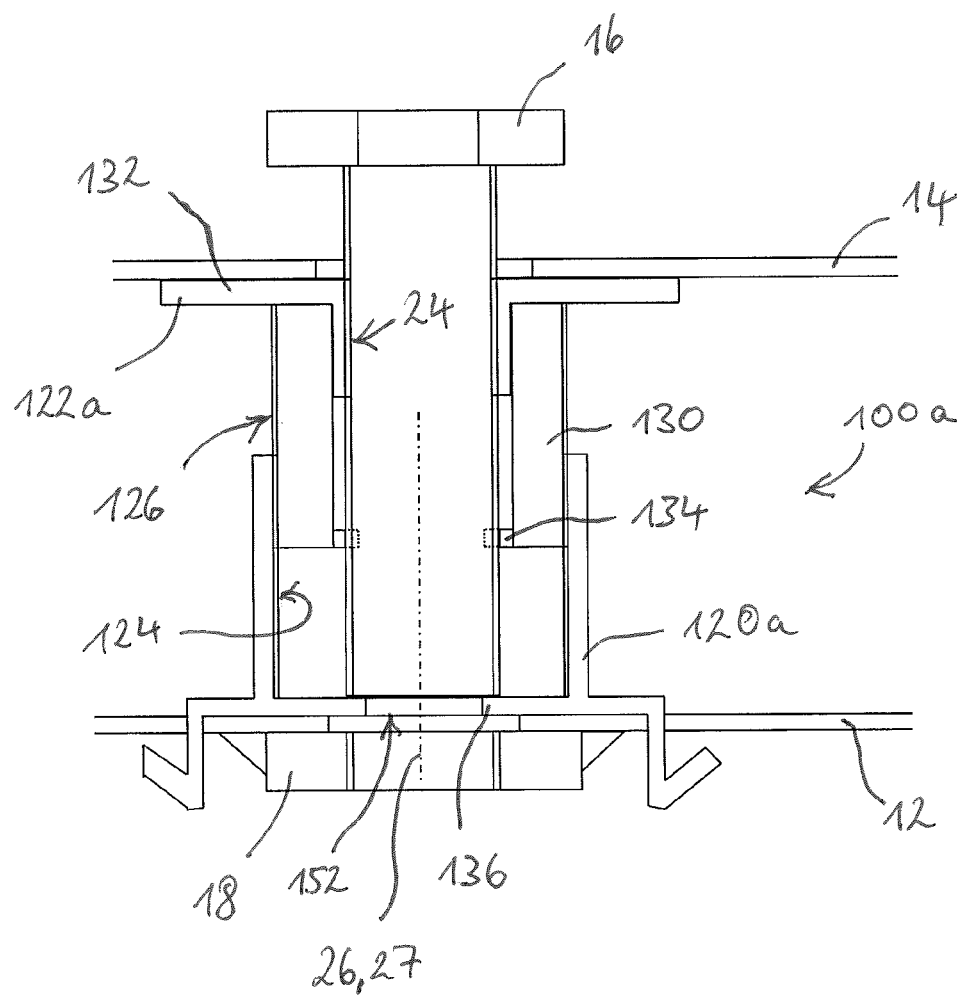
FIG. 19 shows a sectional illustration of the device from FIG. 17 in an arrangement between two parts and with the compensation device completely unscrewed from the holding device.

In an enabled position, as schematically illustrated in FIG. 22b, due to the frictional engagement that is present between the connecting screw 16 and the compensation device 122a, a further screwing movement of the connecting screw 16 causes the compensation device 122a to be rotated relative to the holding device 120a, which in particular is rotatably fixedly fastened to the first part 12 and thus moved in the direction of the second part 14, as shown in FIG. 18. By further rotation, the holding device 120a ultimately comes into contact with the second part 14, as shown in FIG. 19.

Figure 23:
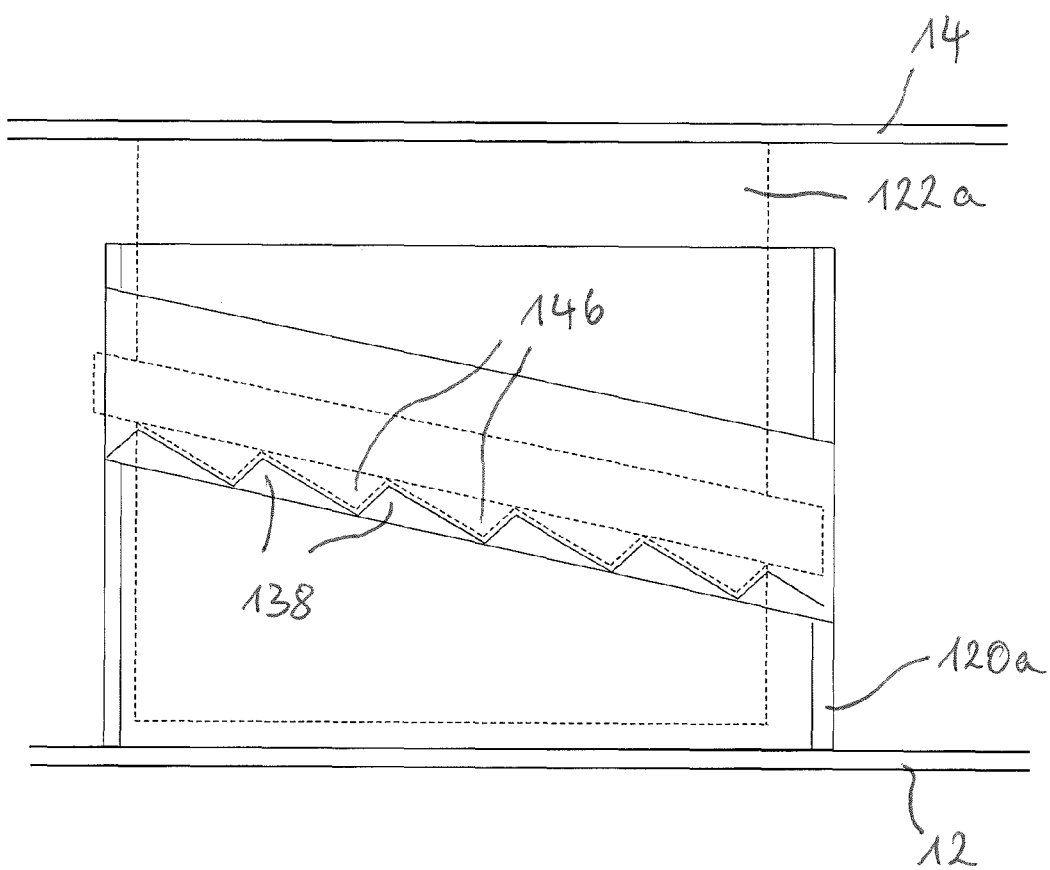
FIG. 23 shows a schematic side view of the thread engagement from FIG. 22a in an arrangement of the holding device and the compensation device between two screwed-together parts.

As soon as the compensation device 122a comes into contact with the second part 14, further screwing in of the connecting screw 16 generates an axial force between the compensation device 122a and the holding device 120a. In particular, this axial force may result in a linear relative movement between the compensation device 122a and the holding device 120a, via which a blocked position of the anti-twist lock is once again assumed. Relative rotation of the compensation device 122a and the holding device 120a may thus be avoided in a fastening position thereof. Such a blocked position of the anti-twist lock when the compensation device 122a is in contact with the second part 14 is schematically illustrated in FIG. 23.

At the same time, when the compensation device 122a is in contact with the second part 14, further screwing in of the connecting screw 16 may generate an axial force on the screw support means 136. When a predefined axial force is exceeded, the supporting effect of the screw support means 136 is overcome and the connecting screw 16 may penetrate the through opening 152 in the holding device 120a and ultimately come into engagement with the fastening nut 18 in order to screw the parts 12 and 14 together.

In the area of the through opening 152 in the holding device 120a, the connecting screw 16 is in engagement or in contact with a material section of the holding device 120a that has been formed by deformation of the screw support means 136 or that adjoins same. Since the holding device 120a is preferably made of plastic and the connecting screw 16 is preferably made of metal, an advantageous material pairing results in the area of the through opening 152. In particular, a securing function for the position of the connecting screw 16 may be provided by the plastic material of the holding device 120a.

Figure 20:
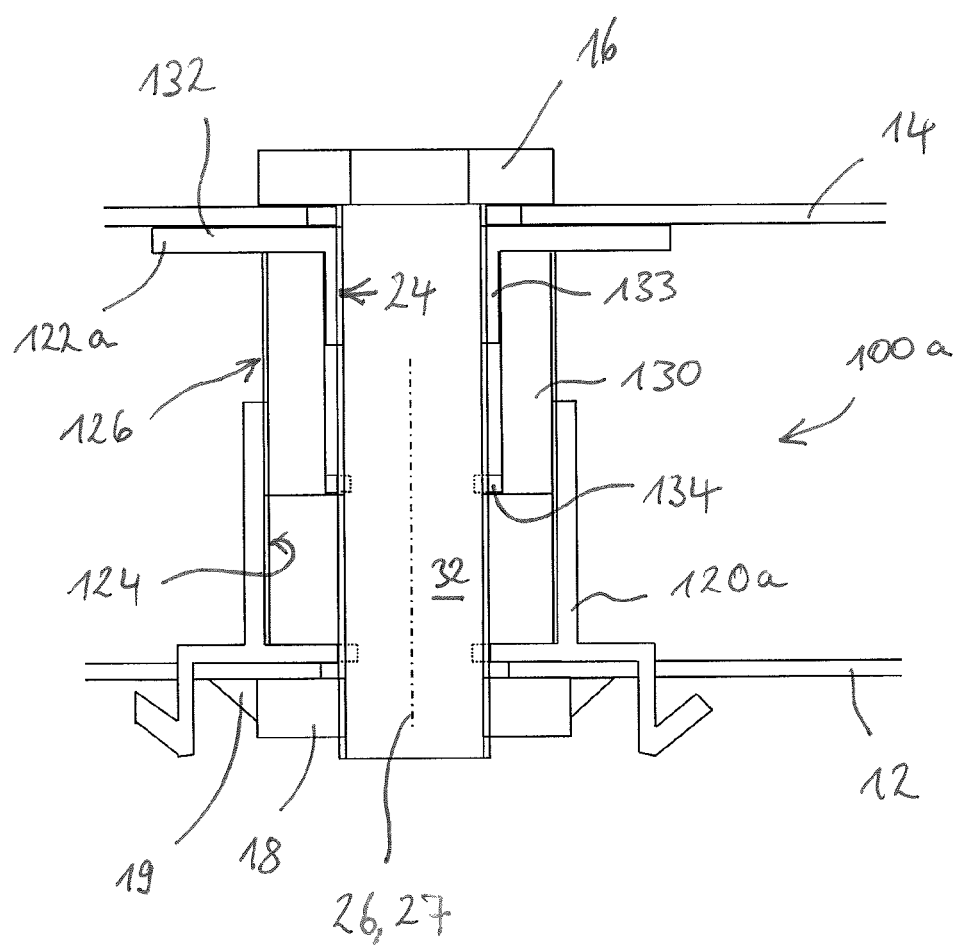
FIG. 20 shows a sectional illustration of the device from FIG. 19 in an arrangement between two screwed-together parts.

A completely screwed-together position of the two parts 12 and 14 using the device 100a is shown in FIG. 20. The compensation device 122a has been unscrewed from the holding device 120a and brought into contact with the second part 14. The connecting screw 16 is thus simultaneously in engagement with the internal thread of the compensation device 122a and with the internal thread of the fastening nut 18. This in turn ensures a force flow via the section 32 of the connecting screw 16 that extends between the inner engagement structure 24 of the compensation device 122a and the fastening nut 18. In addition, the device 100a allows a force flow to the first part 12 via the holding device 120a, thus ensuring a particularly good force distribution. Lastly, the anti-twist lock may prevent undesirable rotation of the compensation device 122a relative to the holding device 120a out of the position shown in FIGS. 20 and 23.

Figure 24A:
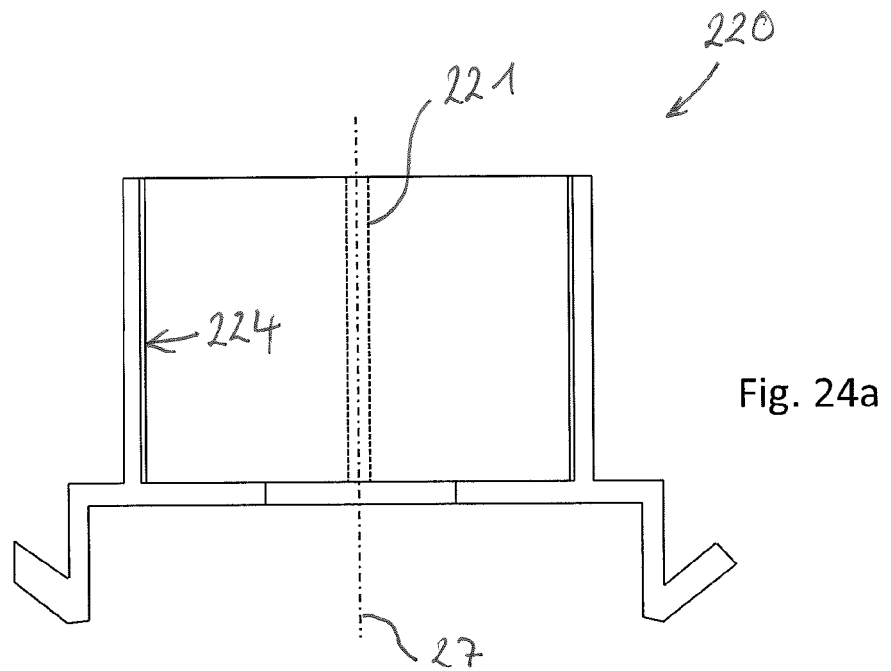
FIG. 24a shows a sectional illustration of a holding device according to the invention, according to a fifth variant.
Figure 24B:
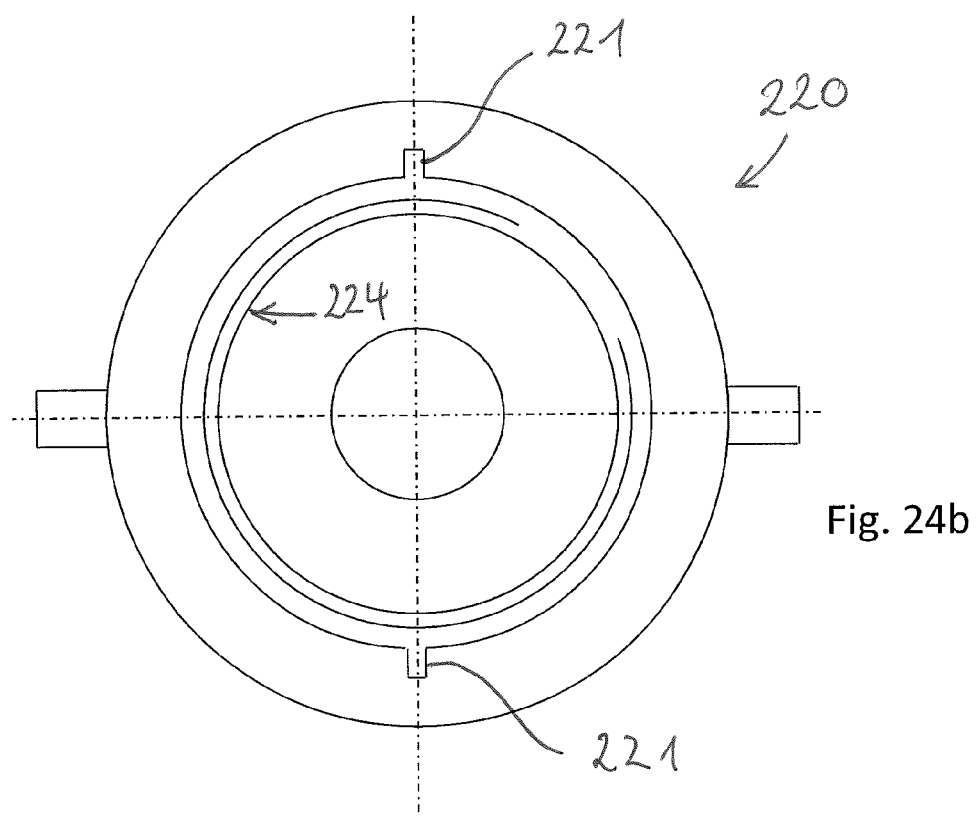
FIG. 24b shows a top view of the holding device from FIG. 24a, FIG. 25a shows a sectional illustration of a compensation device according to the invention, according to a sixth variant, with the support element inserted.
Figure 25A:
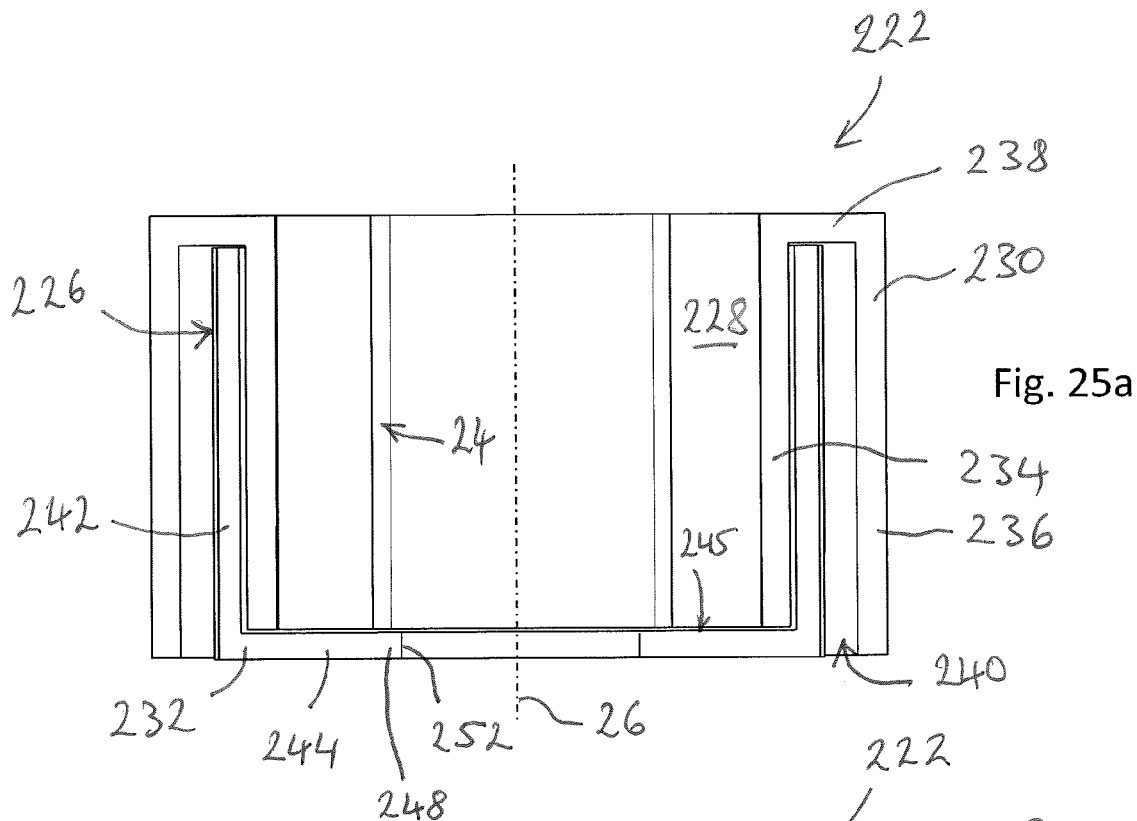
FIG. 25b shows a sectional illustration of the compensation device from FIG. 25a, with the support element partially unscrewed.
Figure 25B:
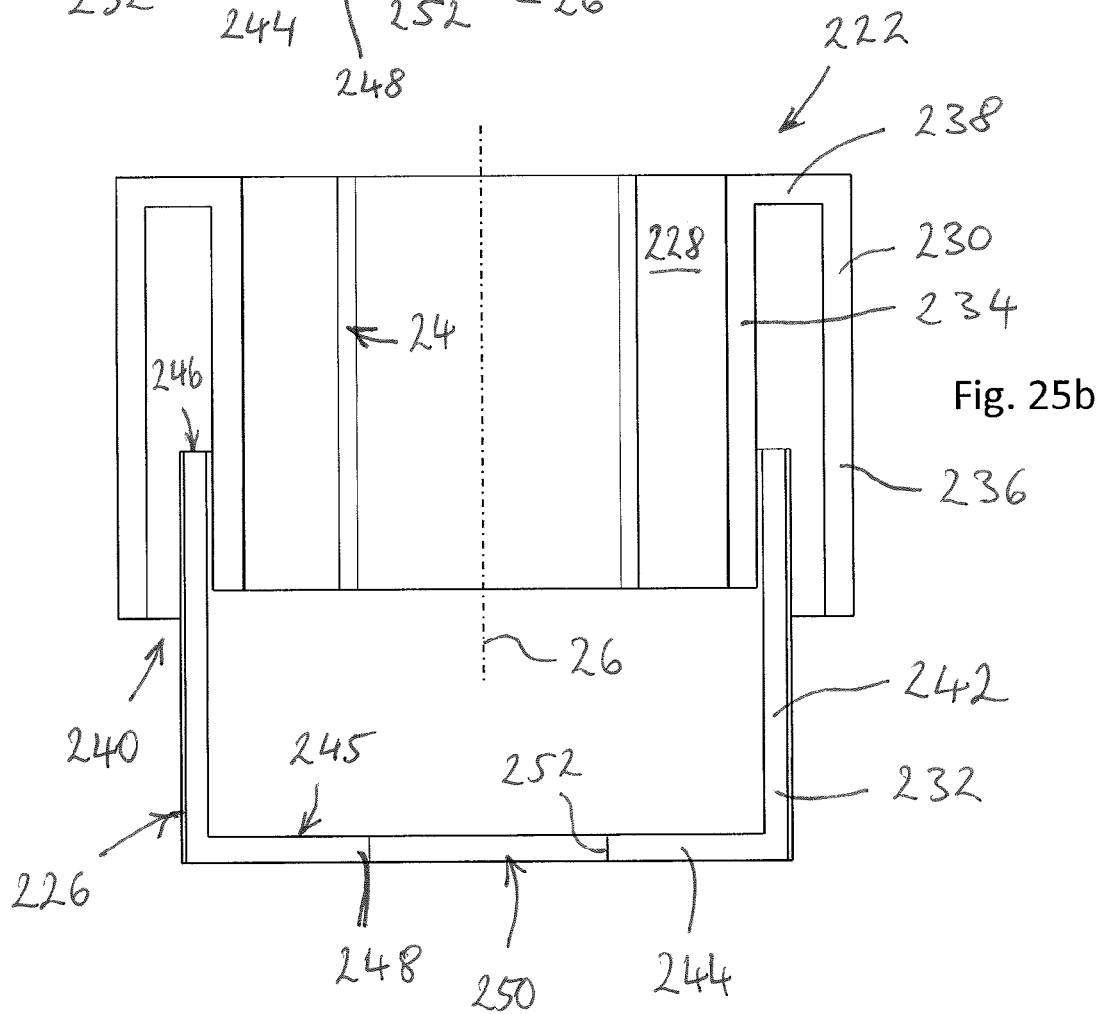

FIGS. 24a and 24b show sectional illustrations of a holding device 220 according to the invention, according to a fifth variant. Such a holding device 220 may form part of a device 200 according to the invention for compensating for tolerances according to a fifth embodiment, as shown in FIGS. 27 through 31, for example. FIGS. 25*a* and 25*b* show sectional illustrations of a compensation device 222 according to the invention, according to a fifth variant, in different positions. Such a compensation device 222 may likewise form part of a device 200 according to the invention for compensating for tolerances, according to a fifth embodiment, as shown in FIGS. 27 through 31, for example.

Figure 26A:
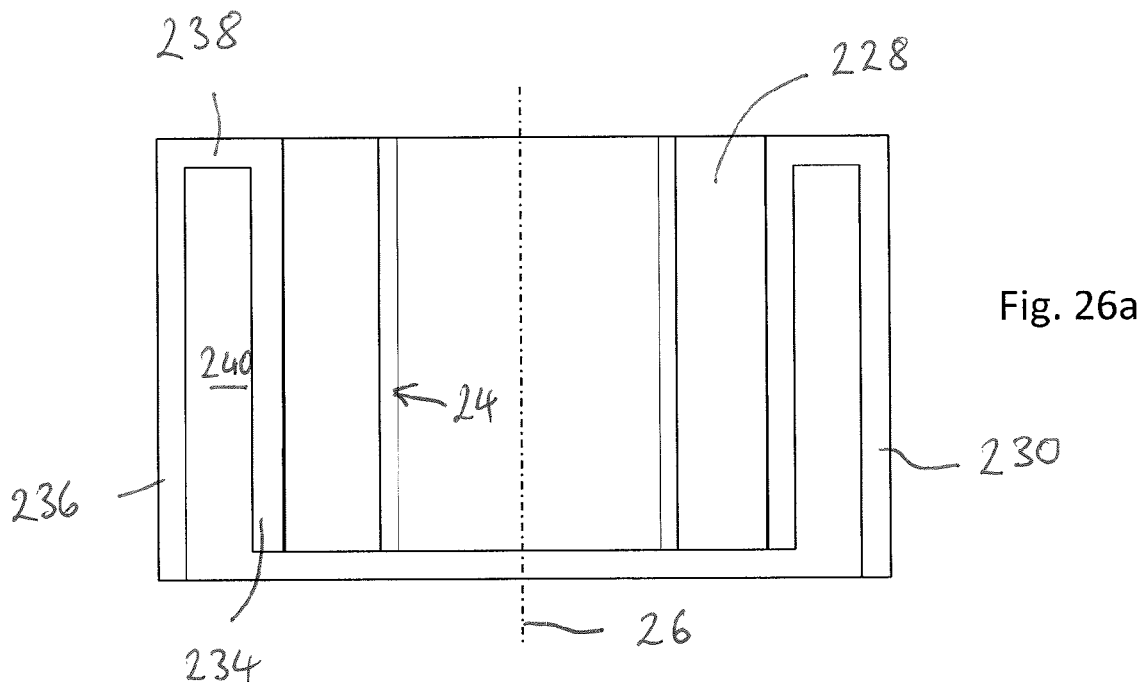
FIG. 26a shows a sectional illustration of a screw engagement element according to the invention and a holding engagement element of the compensation device from FIGS. 25a and 25b.
Figure 26B:
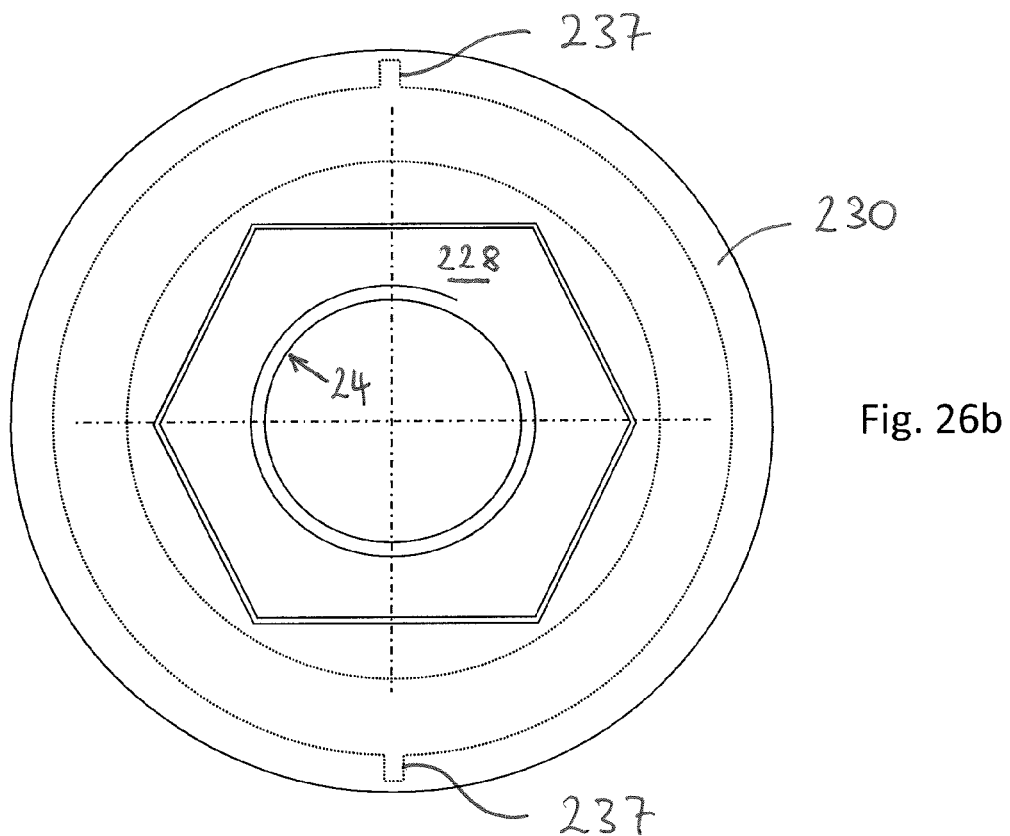
FIG. 26b shows a top view of the screw engagement element and the holding engagement element from FIG. 26a, FIG. 27 shows a sectional illustration of a device according to the invention according to a fifth embodiment, with a holding device from FIG. 24a and a compensation device from FIG. 25a in an arrangement between two parts.
Figure 27:
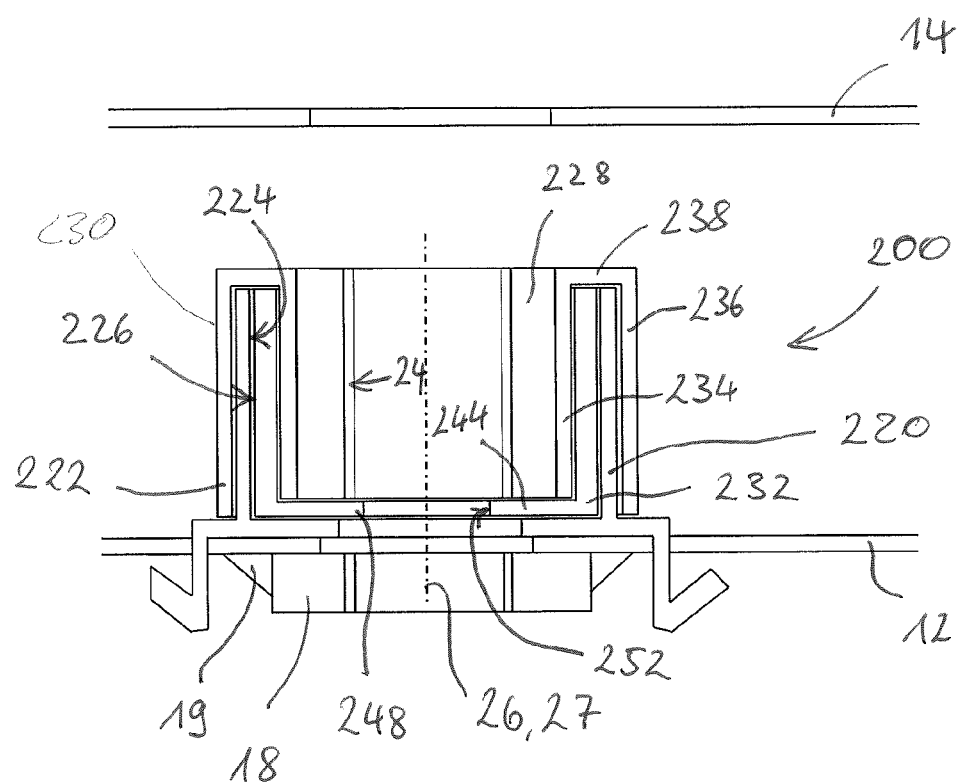

Lastly, FIG. 26*a* shows a sectional illustration of the screw engagement element 228 and the holding engagement element 230 of the compensation device 222 from FIG. 25*a*. FIG. 26*b* shows the screw engagement element 228 and the holding engagement element 230 from FIG. 26*a* in a top view.

FIGS. 27 through 31 show schematic illustrations of a device 200 for compensating for tolerances according to a fifth embodiment. The device 200 has a holding device 220 as shown in FIGS. 24*a* and 24*b*, and a compensation device 222 as shown in FIGS. 25*a* and 25*b*. An inner engagement structure 24 in the form of an internal thread is likewise formed on the compensation device 222.

The compensation device 222 has a multipart design, wherein the different components may be rotatably or linearly guided relative to the holding device 220. The compensation device 222 may in particular have a screw engagement element 228, a holding engagement element 230, and a support element 232, as also shown in FIGS. 25*a* through 26*b*. The inner engagement structure 24 is formed on the screw engagement element 228. The holding engagement element 230 may enclose the screw engagement element 228, at least in sections, and may also be made of a different material than the screw engagement element 228. In particular, the screw engagement element 228 is made of a metal material and the holding engagement element 230 is made of a plastic material. The screw engagement element 228 may be fixedly connected to the holding engagement element 230, for example via a force-fit, integrally joined, and/or form-fit connection. The screw engagement element 228 may be designed as a hexagon nut, and may be fixedly embedded in the holding engagement element 230.

The holding engagement element 230 may have two wall sections 234 and 236 that extend inside one another, in particular concentrically, and that are connected to one another by a connecting wall section 238. The connecting wall section 238 may also form a contact surface for contact with a second part 14. A receiving space 240 for accommodating the support element 232 and the holding device 220 is defined by the wall sections 234, 236 and the connecting wall section 238.

The holding engagement element 230 is linearly guided on the holding device 220. For this purpose, a guide structure 221, shown in FIGS. 24*a* and 24*b*, for linear guiding may be formed on an outer circumferential surface of the holding device 220, and a complementary guide means 237, shown in FIG. 26*b*, for linear guiding may be formed on the inner circumferential surface of the outer wall section 236. The holding engagement element 230 together with the screw engagement element 228 may thus be linearly moved with respect to the holding device 220. The guide structure may advantageously be by a protrusion, and the guide means 237 may be by a recess. The protrusion and the recess may engage with one another in the manner of a tongue and groove connection, thus providing a linear guide.

In addition, the support element 232 is rotatably guided relative to the holding device 220. The rotatable guiding is achieved by a thread engagement. For this purpose, an internal thread 224 that is in engagement with an external thread 226 of the support element 232 may be formed on an inner circumferential surface of the holding device 220. The internal thread 224 and the external thread 226 may each be left-hand threads which in particular have a pitch that corresponds to the pitch of the inner engagement structure 24 designed as an internal thread. An anti-twist lock may be provided on the internal thread 224 and/or the external thread 226, as described above with regard to the embodiment according to FIGS. 16 through 23. To convert the anti-twist lock from a blocked into an enabled position, the holding device 220 may be equipped with a screw support means, not shown in greater detail in FIGS. 27 through 31, which may have a design that corresponds to the above design.

The support element 232 has a circumferential wall section 242 and a collar section 244 that adjoins the circumferential wall section 242. The collar section 244 forms in particular a support surface 245 for supporting the holding engagement element 230 and/or the screw engagement element 228 in the direction of the first part 12. Likewise, an end-face surface 246 of the circumferential wall section 242 facing the second part 14 may ensure support of the holding engagement element 230.

The support element 232 also has a screw support means 248 on which a connecting screw 16, not shown in FIG. 8, may be supported. The screw support means 248 may be an inner section of the collar section 244 that delimits a through opening 250 in the support element 232. The support element 232 may also have a frictional engagement means 252 for creating frictional engagement by means of a connecting screw 16. The frictional engagement means 252 may be formed on an inner circumferential surface of the collar section 244.

Figure 28:
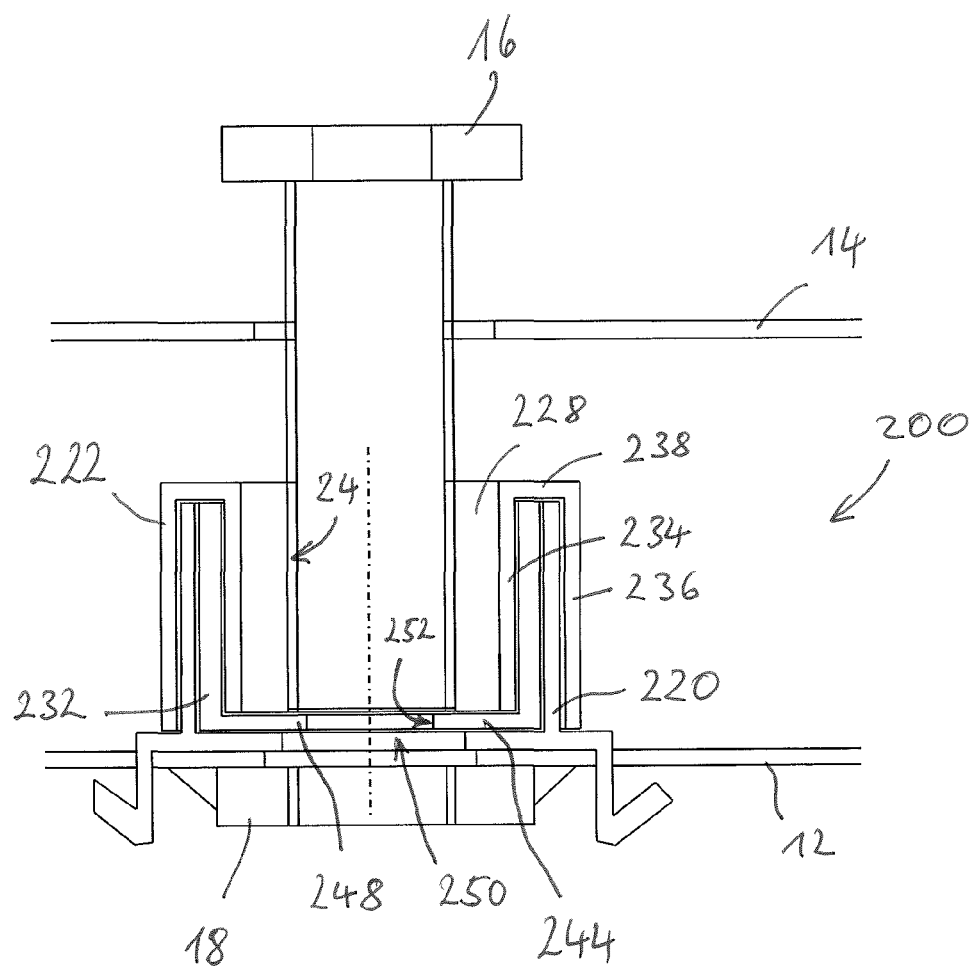
FIG. 28 shows a sectional illustration of the device from FIG. 27 in an arrangement between two parts and with the connecting screw inserted.

The operating principle of the device 200 is now explained with reference to FIGS. 27 through 31. For use, the device 200 is to be situated between two parts 12 and 14 to be screwed together. A connecting screw 16 having a right-hand thread is to be led through an opening in the second part 14 and screwed into the compensation device 222, in particular into the inner engagement structure 24 of the screw engagement element 228 designed as an internal thread, as shown in FIG. 28. By further screwing in of the connecting screw 16, its end section comes into contact with the screw support means 248, as likewise shown in FIG. 28.

Figure 29:
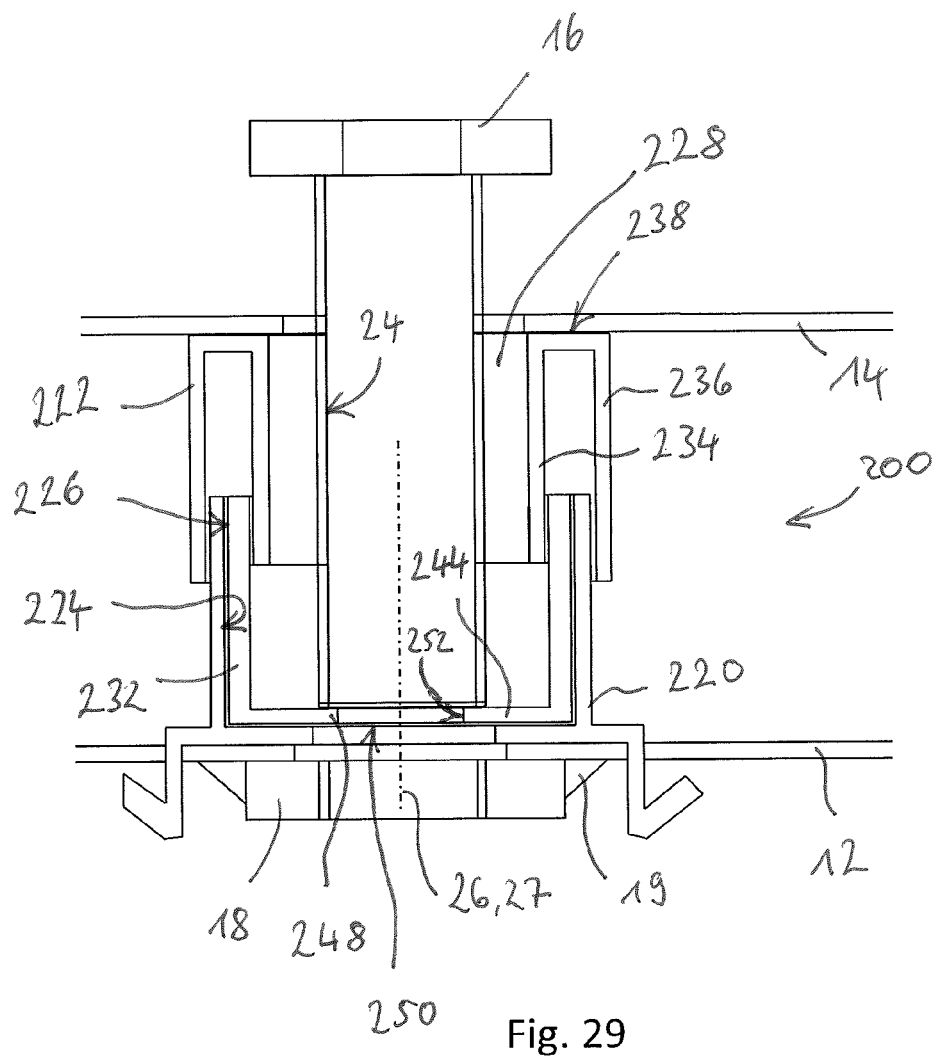
FIG. 29 shows a sectional illustration of the device from FIG. 28 in an arrangement between two parts and with the screw engagement element and holding engagement element lifted.

In the supported position of the connecting screw 16 on the screw support means 248, screwing the connecting screw 16 further into the screw engagement element 228 causes the screw engagement element to be linearly moved in the direction of the second part 14, i.e., away from the holding device 220. Accordingly, the connecting screw 16 together with the screw engagement element 228 forms a worm gear. As soon as the screw engagement element 228 comes into contact with the second part 14, as shown in FIG. 29, further screwing in of the connecting screw generates an axial force on the screw support means 248. When a predefined axial force is exceeded, the supporting effect of the screw support means 248 is overcome and the connecting screw 16 may penetrate the through opening 250.

Figure 30:
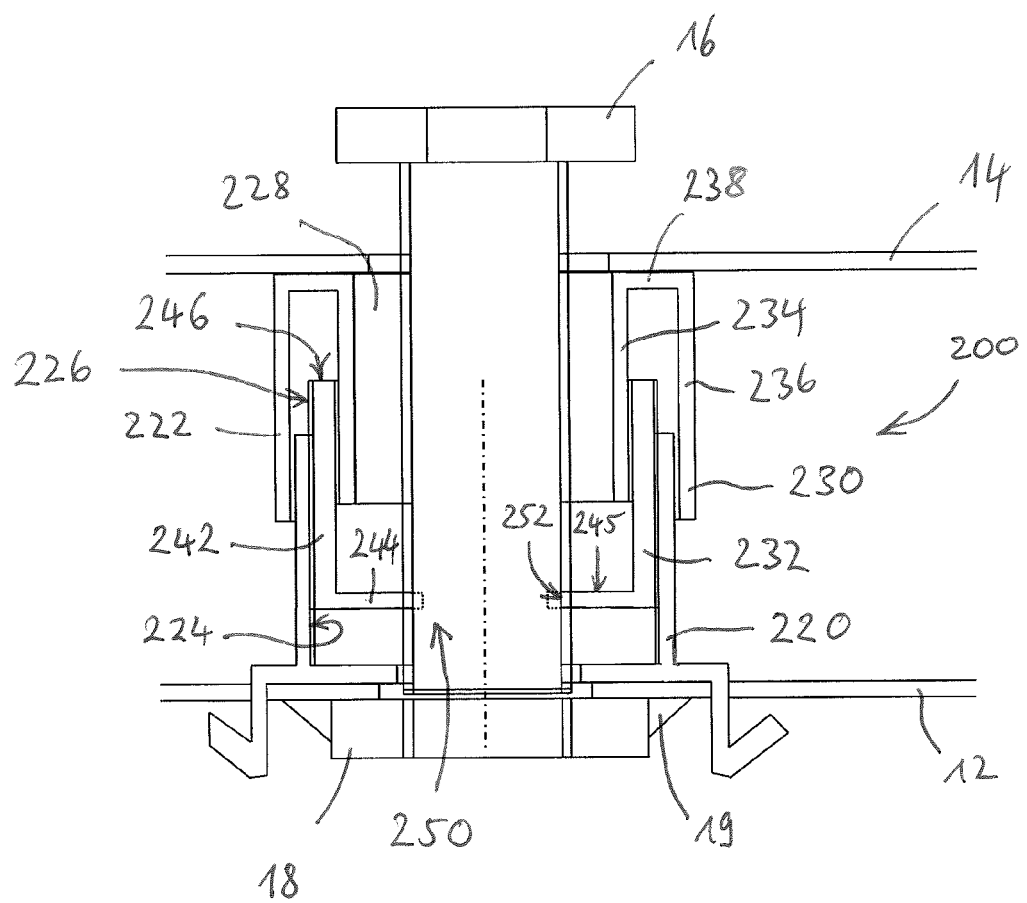
FIG. 30 shows a sectional illustration of the device from FIG. 29 in an arrangement between two parts and with the support element partially unscrewed.

By inserting the connecting screw 16 into the through opening 250, frictional engagement between the connecting screw 16 and the support element 232 may be created due to the frictional engagement means 252. As the result of further screwing movements of the connecting screw 16, the support element 232 may then be rotated relative to the holding device 220, which is rotatably fixedly fastened to the first part 12. Due to the rotatable guiding by a left-hand thread, the support element 232 is moved in the direction of the second part 14, in particular unscrewed from the holding device 220, as shown in FIG. 30. The support element 232 is unscrewed from the holding device 220 until the end-face surface 246 and/or the support surface 245 come(s) into contact with the holding engagement element 230 and/or the screw engagement element 228, and thus develops a supporting effect. At the same time, engagement of the connecting screw with the fastening nut 18 is established.

Figure 31:
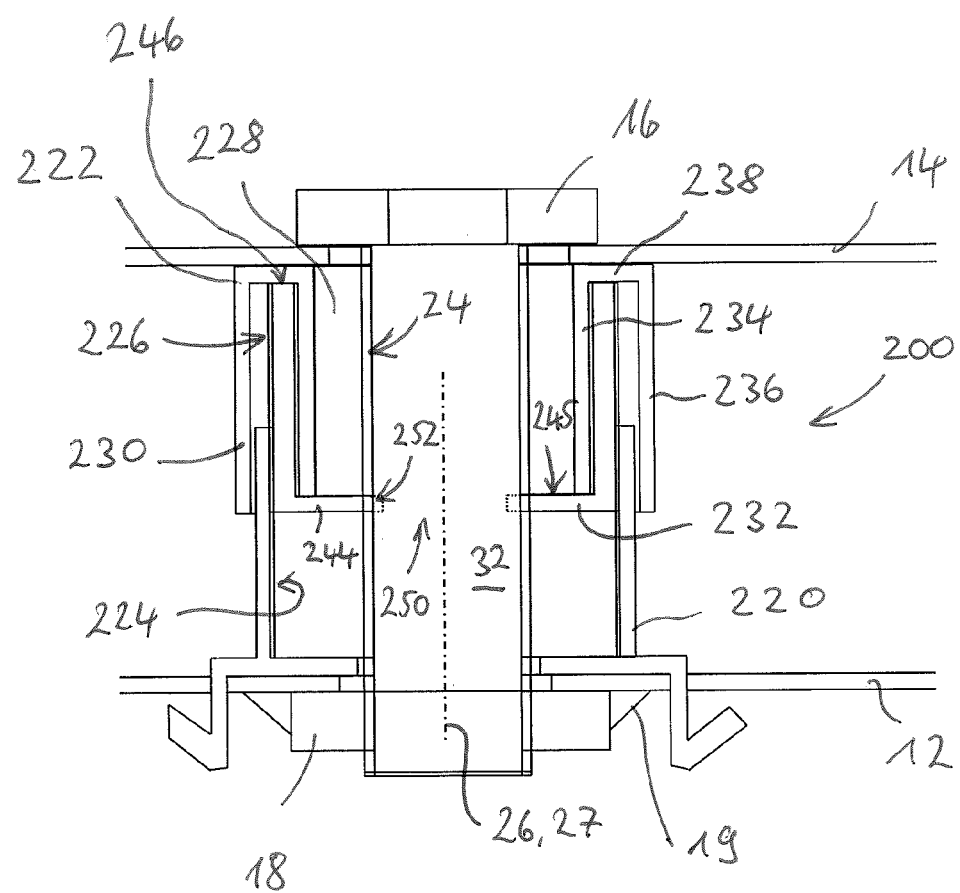
FIG. 31 shows a sectional illustration of the device from FIG. 30 in an arrangement between two screwed-together parts and with the support element completely unscrewed.

A completely screwed-together position of the two parts 12 and 14, using the device 200, is shown in FIG. 31. The screw engagement element 228 and the holding engagement element 230 of the compensation device 222 have been moved away from the holding device 220 and brought into contact with the second part 14. Likewise, the support element 232 is unscrewed from the holding device 220. The connecting screw 16 is simultaneously in engagement with the internal thread of the compensation device 222 and with the internal thread of the fastening nut 18. This ensures a force flow via the section 32 of the connecting screw 16, which extends between the compensation device 222 and the fastening nut 18. In addition, the device 200 allows a force flow via the holding device 220, the support element 232, and the holding engagement element 230 to the first part 12, thus ensuring a particularly good force distribution. Lastly, the anti-twist lock may prevent undesirable rotation of the support element 232 relative to the holding device 220 out of the position shown in FIG. 31.

A sequential movement of the components of the compensation device 222 relative to the holding device 220 has been described above. It is likewise possible for the components of the compensation device 222 at the same time to be moved relative to the holding device 220. For this purpose, the support element 232 may be designed without a screw support means, so that the connecting screw 16 is in frictional engagement immediately upon reaching the support element 232. The moving out of the screw engagement element 228 and of the support element 232 may thus take place simultaneously. For this purpose, it is particularly advantageous when the pitch of the inner engagement structure 24, designed as an internal thread, corresponds to the pitch of the left-hand thread on the support element 232 and on the holding device 220. The movements of the screw engagement element 228 and of the support element 232 may thus take place synchronously.

Figure 32A:
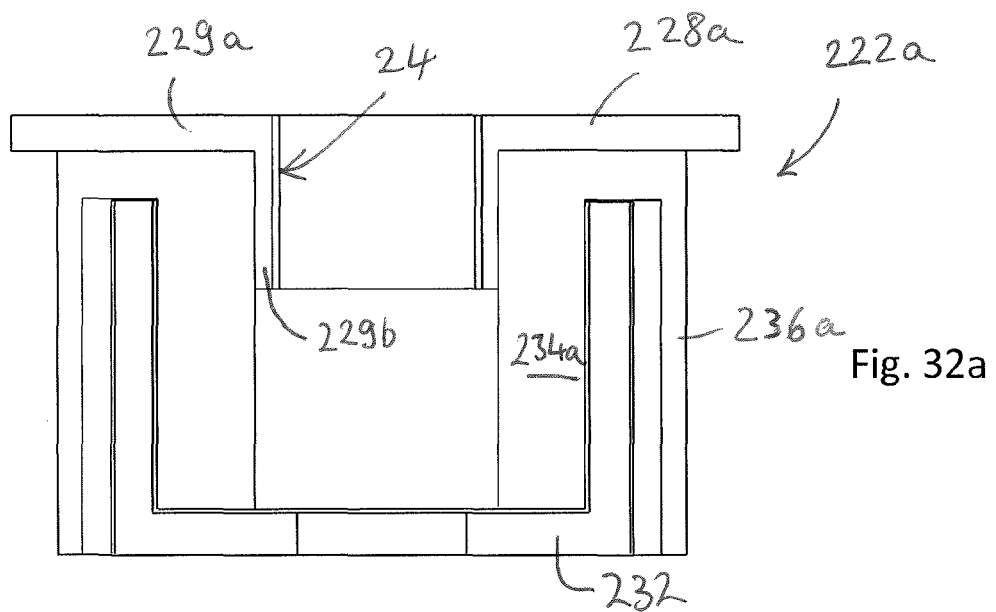
FIG. 32a shows a sectional illustration of a compensation device according to the invention according to a seventh variant, with the support element inserted.
Figure 32B:
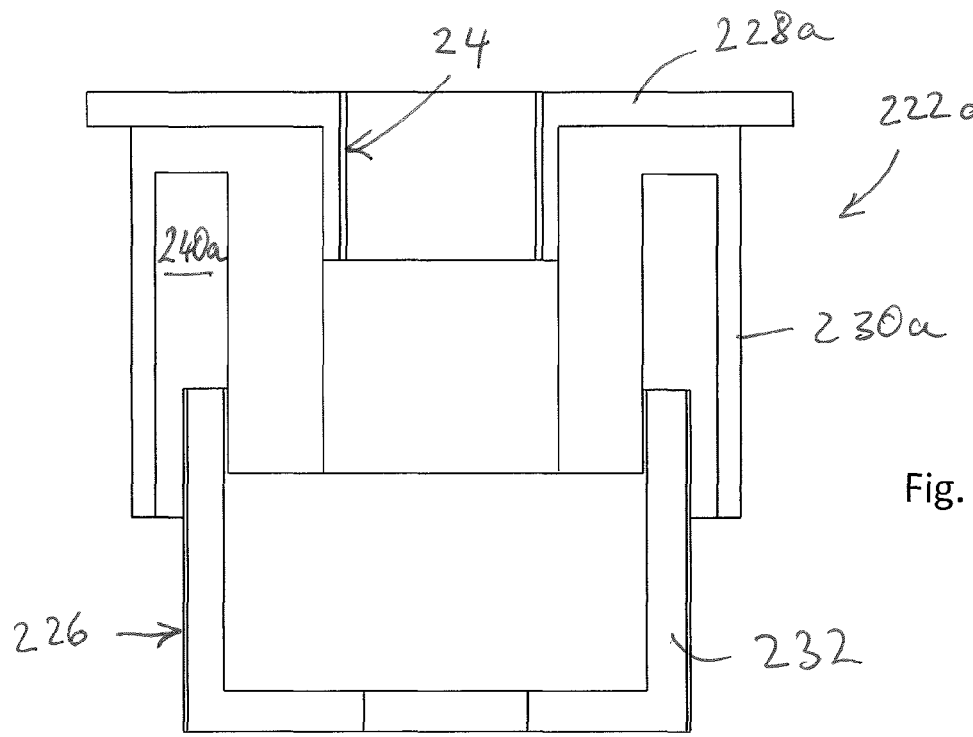
FIG. 32b shows a sectional illustration of the compensation device from FIG. 25a with the support element partially unscrewed.
Figure 33A:
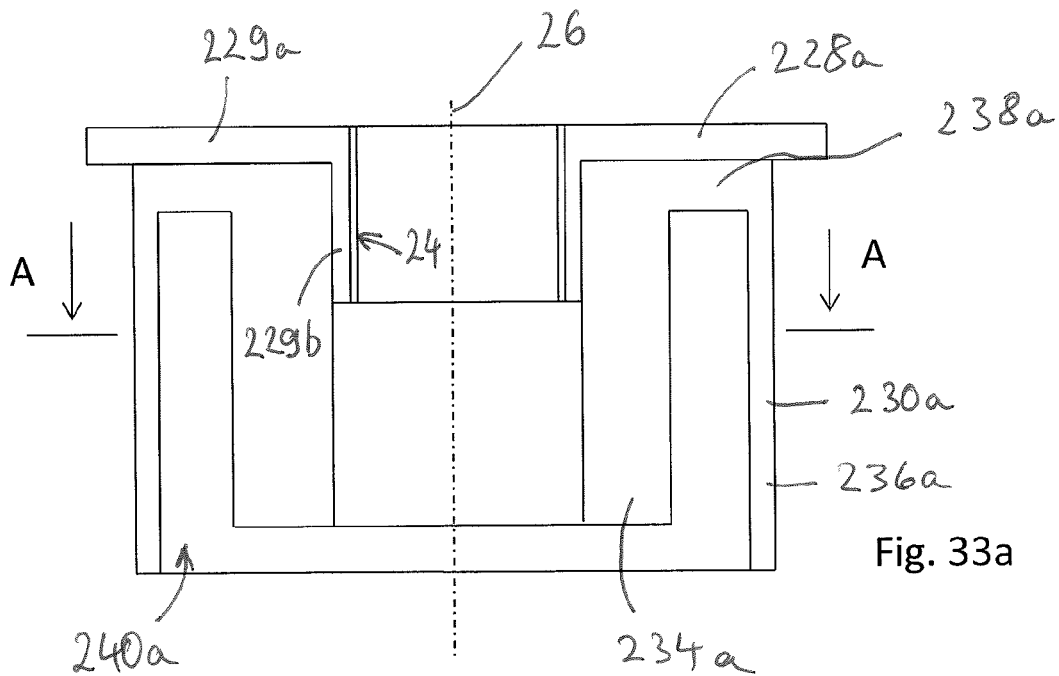
FIG. 33a shows a sectional illustration of a screw engagement element according to the invention and a holding engagement element of the compensation device from FIGS. 32a and 32b.
Figure 33B:
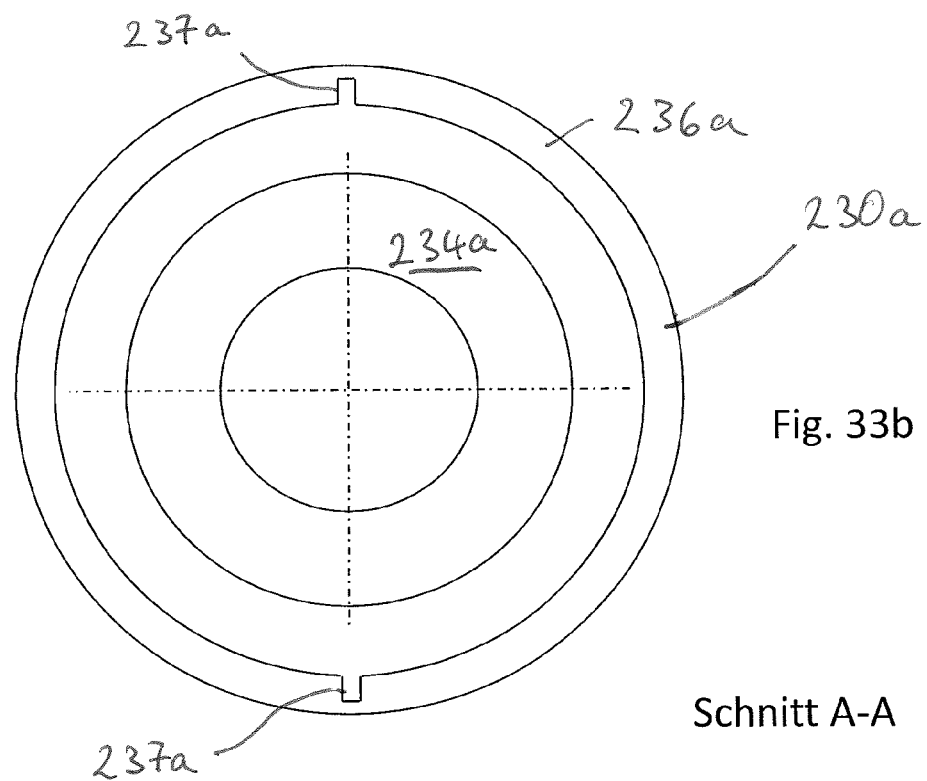
FIG. 33b shows a sectional illustration of the holding engagement element from FIG. 33a along a section line A-A.

FIGS. 32a and 32b show sectional illustrations of a compensation device 222a according to the invention, according to a sixth variant, in different positions. Such a compensation device 222a may form part of a device 200a according to the invention for compensating for tolerances according to a sixth embodiment, as shown in FIGS. 34 through 38, for example. FIG. 33a shows a sectional illustration of the screw engagement element 228a and the holding engagement element 230a of the compensation device 222a from FIG. 32a. FIG. 33b shows the holding engagement element 230a from FIG. 33a in a sectional illustration along the plane A-A indicated in FIG. 33a.

The device 200a according to the invention shown in FIGS. 34 through 38 according to the sixth embodiment may also have a holding device 220, shown in FIGS. 24a and 24b, according to the fifth variant. The sixth embodiment thus differs from the fifth embodiment solely by the design of the compensation device 222a.

An inner engagement structure 24 in the form of an internal thread is likewise formed on the compensation device 222a. The compensation device 222a has a multipart design, it being possible for the different components to be rotatably or linearly guided relative to the holding device 220. The compensation device 222a may in particular have a screw engagement element 228a, a holding engagement element 230a, and a support element 232, as also shown in FIGS. 32a through 33b. The inner engagement structure 24 is formed on the screw engagement element 228a. The holding engagement element 230a may enclose the screw engagement element 228a, at least in sections, and may also be made of a different material than the screw engagement element 228a. In particular, the screw engagement element 228a is made of a metal material and the holding engagement element 230a is made of a plastic material.

The screw engagement element 228a may be fixedly connected to the holding engagement element 230, for example via a force-fit, integrally joined, and/or form-fit connection. A flange section 229a for contact with a second part 14 may be formed on the screw engagement element 228a. A sleeve section 229b may adjoin the flange section 229a. The sleeve section 229b may be inserted into the holding engagement element 230a in order to connect the screw engagement element 228a and the holding engagement element 230a.

The holding engagement element 230a may have two wall sections 234a and 236a that extend inside one another, in particular concentrically, and that are connected to one another by a connecting wall section 238a. The connecting wall section 238a may adjoin the flange section 229a. A receiving space 240a for accommodating the support element 232 and the holding device 220 is defined by the wall sections 234a, 236a and the connecting wall section 238a. The thicknesses of the wall sections 234a and 236a may be different or the same.

The holding engagement element 230a is linearly guided on the holding device 220. For this purpose, a guide means 237a, shown in FIG. 33b, for linear guiding, and with which the guide structure 221 of the holding device 220 engages, may be formed on the inner circumferential surface of the outer wall section 236a. The holding engagement element 230a together with the screw engagement element 228a may thus be linearly moved with respect to the holding device 220. The guide means 237a may be designed as a recess, so that engagement in the manner of a tongue and groove connection for the purpose of linear guiding is made possible.

The support element 232 is rotatably guided relative to the holding device 220. With regard to the design of the support element 232 and its rotatable guiding, reference is made to the above description for the fifth embodiment.

The operating principle of the device 200a according to the sixth embodiment is now explained with reference to FIGS. 34 through 38, with the focus being primarily on the differences from the device 200 according to the fifth embodiment.

Figure 34:
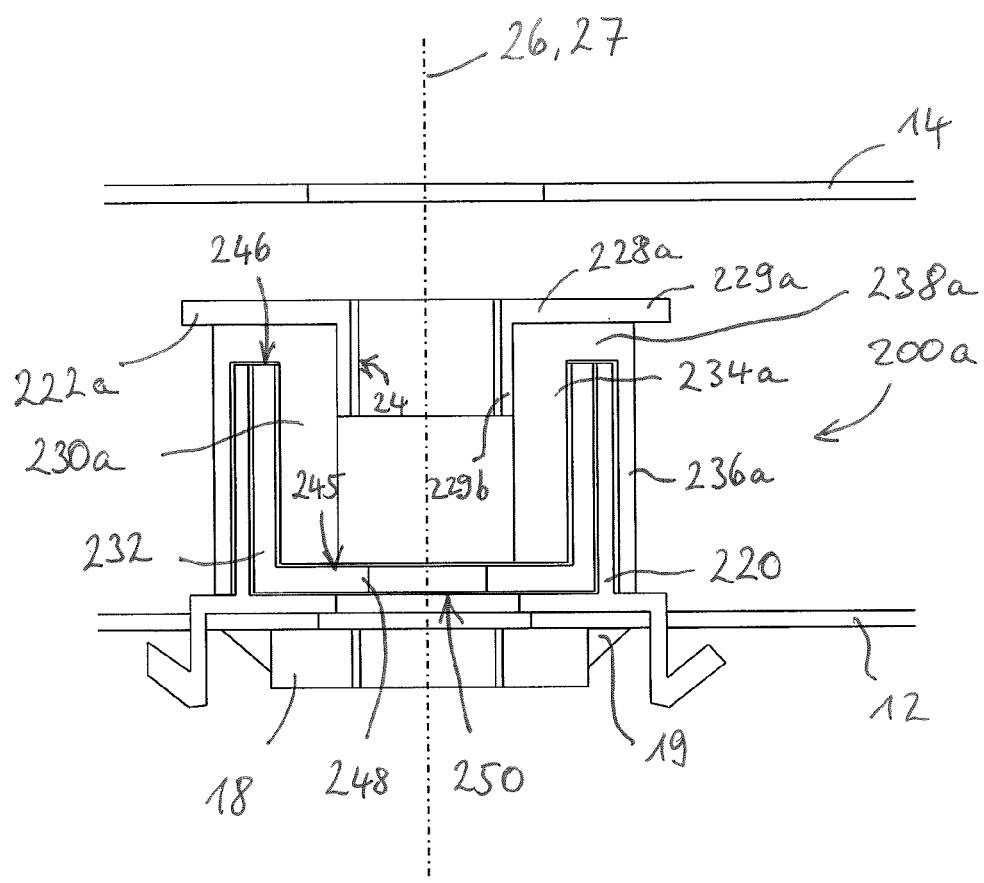
FIG. 34 shows a sectional illustration of a device according to the invention according to a sixth embodiment, with a holding device from FIG. 24a and a compensation device from FIG. 32a in an arrangement between two parts.
Figure 35:
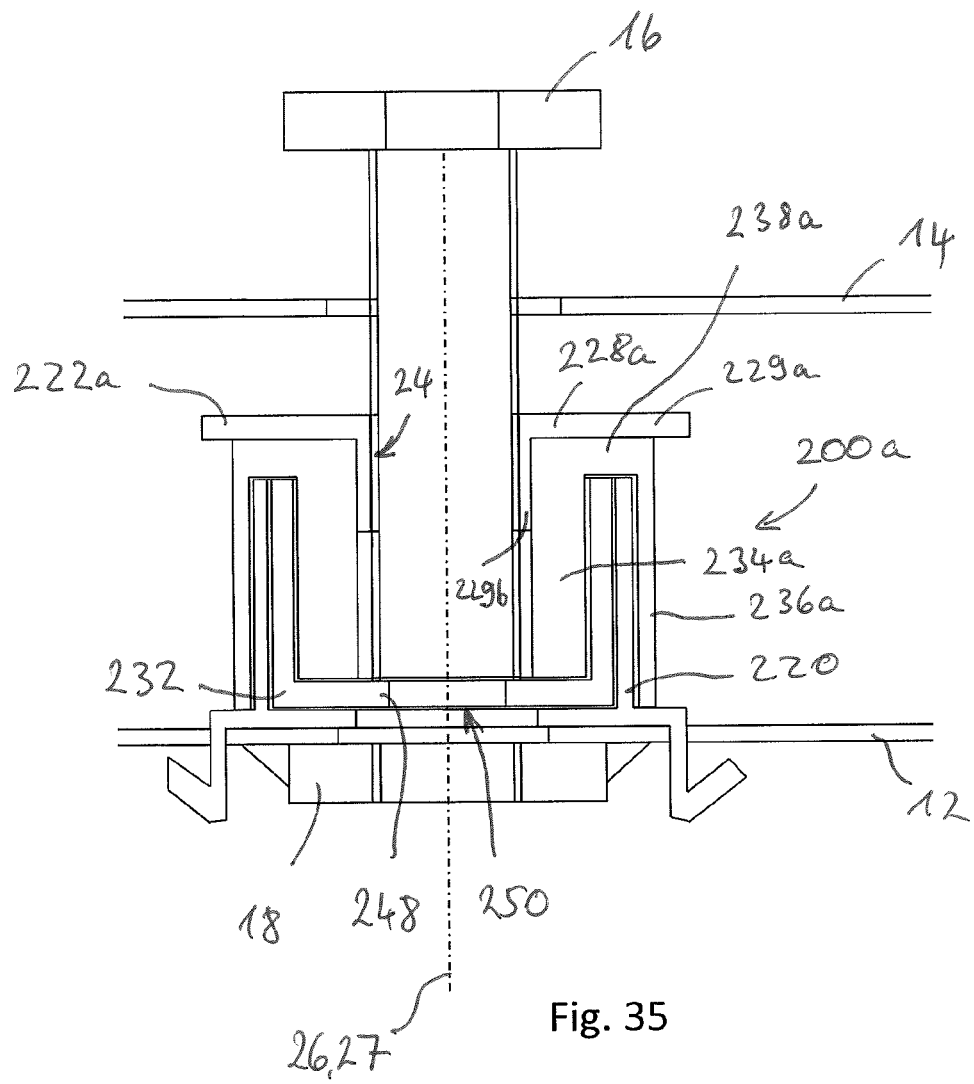
FIG. 35 shows a sectional illustration of the device from FIG. 34 in an arrangement between two parts and with the connecting screw inserted.

FIG. 34 shows the device 200a in an arrangement between two parts 12 and 14 to be screwed together. Figure A connecting screw 16 having a right-hand thread is to be led through an opening in the second part 14 and screwed into the compensation device 222a, as shown in FIG. 35. In the supported position of the connecting screw 16 on the screw support means 248, further screwing of the connecting screw 16 into the screw engagement element 228a causes the screw engagement element to be linearly moved in the direction of the second part 14, i.e., away from the holding device 220.

Figure 36:
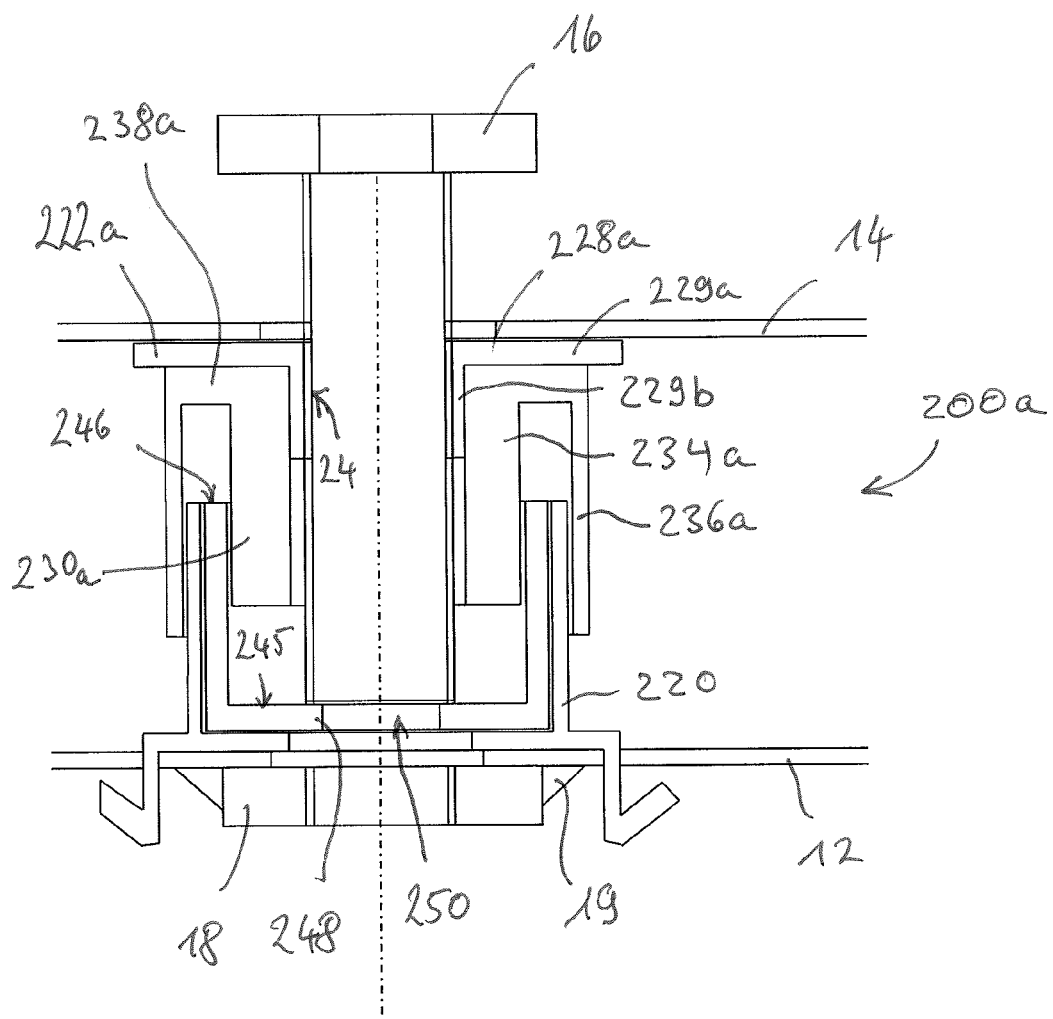
FIG. 36 shows a sectional illustration of the device from FIG. 35 in an arrangement between two parts and with the screw engagement element and holding engagement element lifted.
Figure 37:
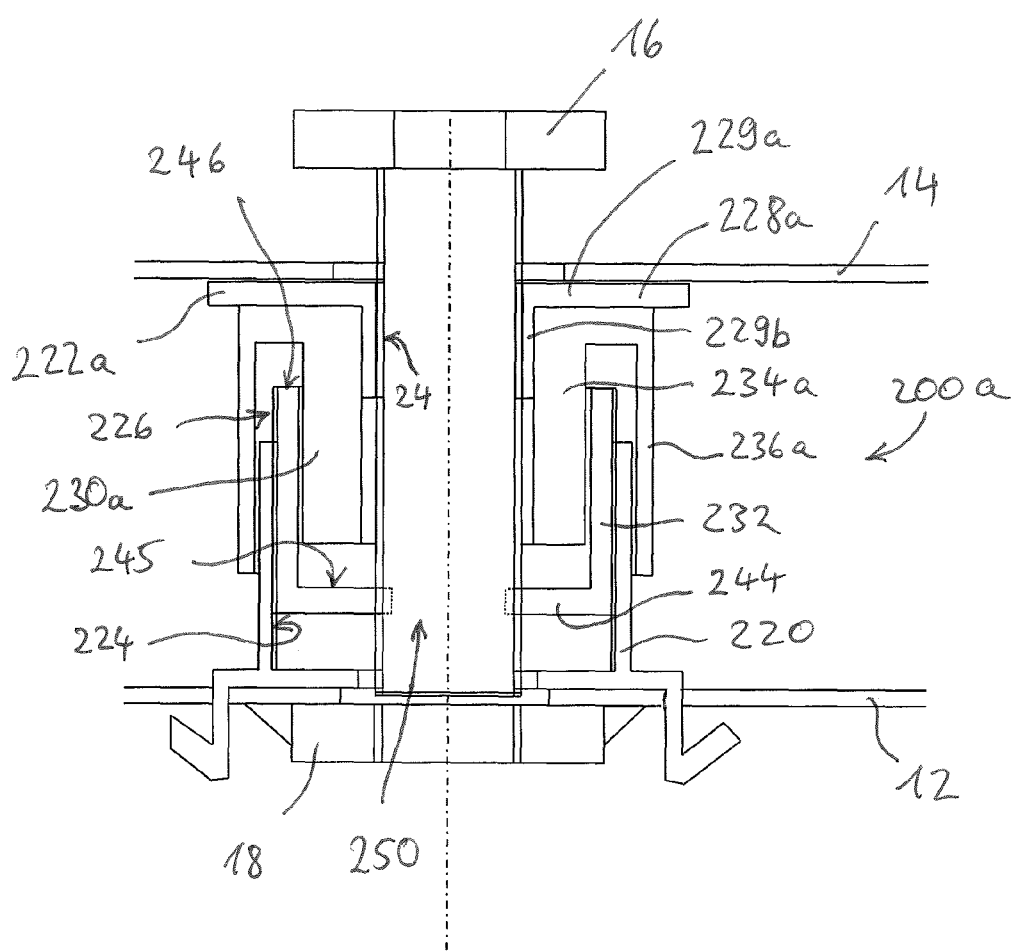
FIG. 37 shows a sectional illustration of the device from FIG. 36 in an arrangement between two parts and with the support element partially unscrewed.

As soon as the flange section 229a of the screw engagement element 228a comes into contact with the second part 14, as shown in FIG. 36, further screwing in of the connecting screw 16 generates an axial force on the screw support means 248. When a predefined axial force is exceeded, the supporting effect of the screw support means 248 is overcome and the connecting screw 16 may penetrate the through opening 250, as the result of which frictional engagement between the connecting screw 16 and the support element 232 may be created. The support element 232 may now be unscrewed from the holding device 220 by further screwing movements of the connecting screw 16, as shown in FIG. 37.

The support element 232 is now unscrewed from the holding device 220 until the end-face surface 246 and/or the support surface 245 come(s) into contact with the holding engagement element 230a and a supporting effect is thus developed. At the same time, engagement of the connecting screw with the fastening nut 18 is established.

Figure 38:
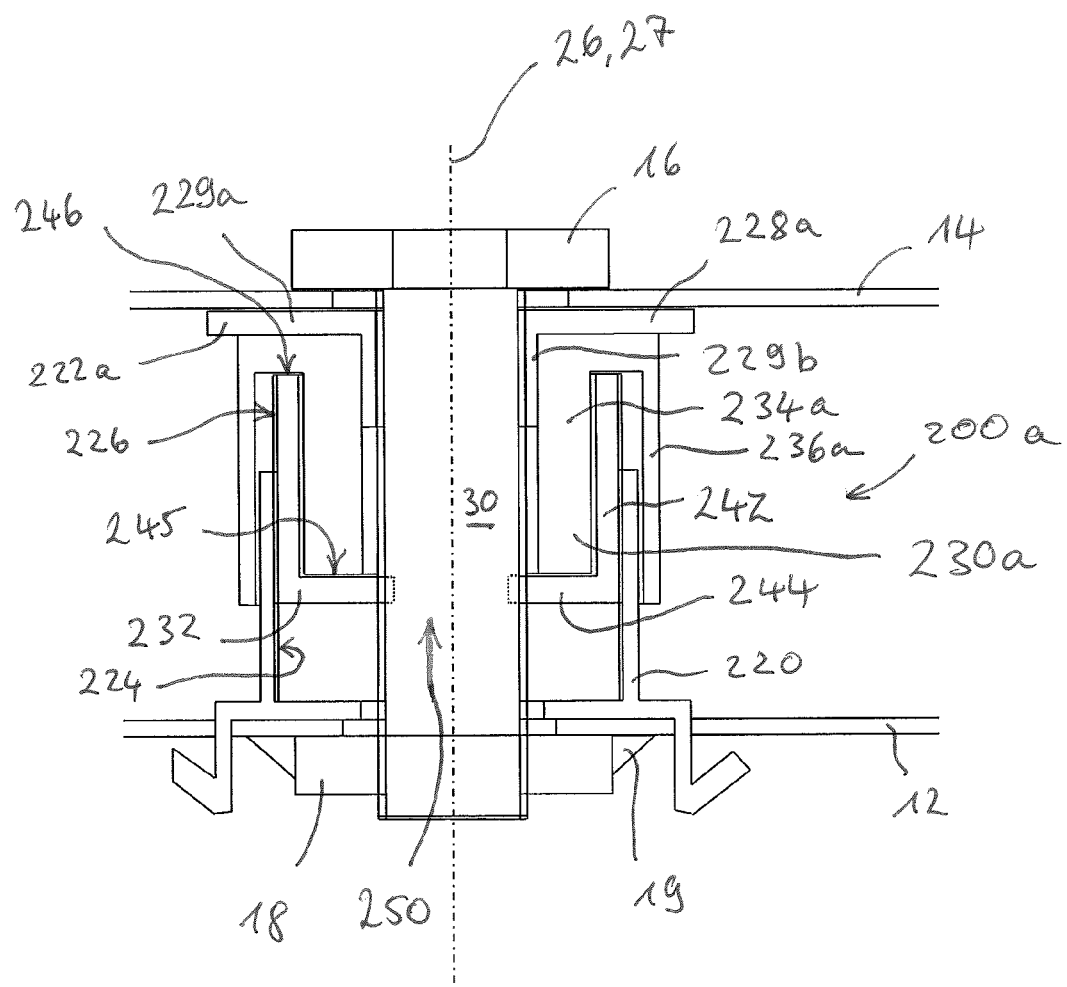
FIG. 38 shows a sectional illustration of the device from FIG. 37 in an arrangement between two screwed-together parts and with the support element completely unscrewed.

A completely screwed-together position of the two parts 12 and 14 using the device 200a is shown in FIG. 38. The screw engagement element 228a and the holding engagement element 230a of the compensation device 222a have been moved away from the holding device 220 and brought into contact with the second part 14. Likewise, the support element 232 is unscrewed from the holding device 220. The connecting screw 16 is simultaneously in engagement with the internal thread of the compensation device 222a and with the internal thread of the fastening nut 18. This ensures a force flow via the section 32 of the connecting screw 16, which extends between the inner engagement structure 24 of the compensation device 222a and the fastening nut 18. In addition, the device 200a allows a force flow via the holding device 220, the support element 232, and the holding engagement element 230 to the first part 12, thus ensuring a particularly good force distribution. Also in the sixth embodiment, an anti-twist lock as shown in FIGS. 21a through 23 may be provided to prevent undesirable rotation of the support element 232 relative to the holding device 220 out of the position shown in FIG. 38.

In addition to the above-described sequential movement of the components of the compensation device 222a relative to the holding device 220, a simultaneous movement of the screw engagement element 228 and of the support element 232 is also possible in the sixth embodiment. In this regard, reference is likewise made to the above description for the fifth embodiment.

LIST OF REFERENCE NUMERALS 10 device
10a device
12 first part
14 second part
16 connecting screw
18 fastening nut
19 weld seam
20 holding device
20a holding device
21 receptacle
22 compensation device
22a compensation device
22b compensation device
23 hexagon nut
24 inner engagement structure
26 longitudinal axis
27 longitudinal axis
28 screw support means
30 through opening
32 section of the connecting screw
34 flange section
36 protrusion
38 recess
100 device
100a device
120 holding device
120a holding device
122 compensation device
122a compensation device
124 internal thread
126 external thread
128 screw engagement element
130 holding engagement element
132 flange section
133 sleeve section
134 frictional engagement means
136 screw support means
138 protrusion
140 recess
142 thread flank
144 thread
146 protrusion
148 recess
150 thread flank
152 through opening
200 device
200a device
220 holding device
221 guide structure
222 compensation device
222a compensation device
224 internal thread
226 external thread
228 screw engagement element
228a screw engagement element
229a flange section
229b sleeve section
230 holding engagement element
230a holding engagement element
232 support element
234 inner wall section
234a inner wall section
236 outer wall section
236a outer wall section
238 connecting wall section
238a connecting wall section
240 receiving space
240a receiving space
242 circumferential wall section
244 collar section
246 end-face surface
248 screw support means
250 through opening
252 frictional engagement means

The invention claimed is:

1. A device for compensating for tolerances between two parts that are to be connected by means of a connecting screw, the device comprising:
   a holding device for arranging on a first part;
   a compensation device that is operable to contact a second part and is situated so as to be movable relative to the holding device,
   the compensation device having an inner engagement structure for form-fit engagement with threads of the connecting screw, wherein, in a connected state of the first and second parts, the compensation device rests against the second part and is in thread engagement with the connecting screw such that the second part is clamped between the compensation device and a head of the connecting screw; and a fastening nut situated on an outer surface of the first part, wherein, in the connected state of the first and second parts, the connecting screw is in thread engagement with the fastening nut, the connecting screw maintaining a relative position of the first and second parts by a form-fit connection of the first and second parts.

2. The device according to claim 1, wherein
the inner engagement structure for form-fit engagement of the connecting screw along a longitudinal extension of the connecting screw and/or at least in sections is an internal thread, in particular, a standard and/or right-hand internal thread.

3. The device according to claim 1,
wherein the compensation device and/or the holding device form/forms part of a worm gear.

4. The device according to claim 1,
wherein the compensation device and the holding device are operable to transmit pressure forces between the parts to be connected.

5. The device according to claim 1,
wherein the compensation device has a one-part or multipart design, and/or comprises a plurality of elements that are fastened to one another and/or situated so as to be movable relative to one another and/or situated so as to be independently movable relative to the holding device.

6. The device according to claim 1,
wherein the compensation device and/or the inner engagement structure comprises a metal material, a plastic material, or a plurality of different materials, and/or the holding device comprises a plastic material, at least in part.

7. The device according to claim 1,
wherein the compensation device and/or at least one element of the compensation device are/is in guiding engagement with the holding device.

8. The device according to claim 1,
wherein the compensation device and/or at least one element of the compensation device have/has a guide means.

9. The device according to claim 1,
wherein the holding device has at least one guide structure for guiding the compensation device and/or for at least one element of the compensation device.

10. The device according to claim 9,
wherein the at least one guide structure of the holding device is formed on an outer circumference and/or on an inner circumference of the holding device, and/or the holding device has a plurality of guide structures.

11. The device according to claim 1,
wherein the compensation device and/or at least one element of the compensation device are/is axially movable with respect to the holding device by rotation about a longitudinal axis and relative to the holding device, and/or
wherein the compensation device and/or an element of the compensation device have/has a frictional engagement means and/or form-fit engagement means for creating frictional engagement and/or a form-fit connection with the connecting screw, and/or
wherein the holding device and/or an element of the compensation device have/has a screw support means that is designed for axial support on the connecting screw, and/or wherein the holding device has a one-part design and/or is rotatably affixable to the first part, and/or the holding device has a fastening means for fastening to the first part and/or the holding device is made of a plastic material, and/or
wherein the compensation device has at least one screw engagement element on which the inner engagement structure is formed, and/or the compensation device is made up solely of a screw engagement element that includes the inner engagement structure.

12. The device according to claim 1,
wherein the compensation device has a holding engagement element that is in guiding engagement with the holding device, and/or is fixedly connected to the screw engagement element and/or encloses and/or surrounds same, at least in sections, and/or wherein the holding engagement element is made of a different material than the screw engagement element.

13. The device according to claim 12,
wherein the screw engagement element is a sleeve element and/or ring element on the inner circumference of which the inner engagement structure is formed, and/or has an end-face surface and/or a flange section for contact with a second part, and/or
wherein the screw engagement element is a screw nut, and/or the inner engagement structure is formed by the internal thread of a screw nut.

14. The device according to claim 1,
wherein the holding device has an inner circumferential shape for the form-fit accommodation of a hexagon nut, and/or a guide structure of the holding device is designed for linear guiding of a hexagon nut.

15. The device according to claim 1,
wherein the compensation device has a support element that is connected between the holding device and the screw
parallel to one another and that define an interspace for accommodating the support element and/or the holding device.

16. The device according to claim 1,
wherein the compensation device has slope support surfaces and/or the holding device has counterslope support surfaces.

17. The device according to claim 16,
wherein the slope support surfaces form a guide means for rotatable guiding on the holding device, and/or the counterslope support surfaces form a guide structure for rotatable guiding of the compensation device and/or at least one element of the compensation device, and/or
wherein an anti-twist lock is formed on the slope support surfaces and/or on the counterslope support surfaces, which blocks or enables rotation of the compensation device relative to the holding device as a function of a relative position between the compensation device and the holding device, and/or
wherein the slope support surfaces are formed on an outer circumference or on an end-face end of the compensation device, and/or the counterslope support surfaces are formed on an inner circumference or on an end-face end of the holding device, and/or
wherein the slope support surfaces and counterslope support surfaces of the compensation device and the holding device are designed as a left-hand thread, and/or
wherein the slope support surfaces of the compensation device are formed by mutually facing thread flanks having different shapes, and/or the counterslope support surfaces of the holding device are formed by mutually facing thread flanks having different shapes.

18. An assembly comprising:
first and second parts;
a device according to claim 1 that is situated between the first and second parts; and
a connecting screw, wherein the first and second parts are screwed together via the connecting screw, and the connecting screw is engaged with the inner engagement structure of the device.

19. The assembly according to claim 18,
wherein the connecting screw for screwing the first and second parts together is screwed into an inner engagement structure that is formed and/or situated on the first part and/or fixedly connected to the first part, and/or
wherein the connecting screw for screwing the first and second parts together is screwed into a fastening nut or into a fastening element having an internal thread; and/or
wherein the fastening nut or the fastening element is situated on the first part and/or is fixedly connected to the first part, and/or
wherein the connecting screw for screwing the first and second parts together is screwed into an internal thread of the first part.

* * * * *